US011467554B2

(12) United States Patent
Rivers et al.

(10) Patent No.: US 11,467,554 B2
(45) Date of Patent: *Oct. 11, 2022

(54) AUTOMATICALLY GUIDED TOOLS

(71) Applicant: SHAPER TOOLS, INC., San Francisco, CA (US)

(72) Inventors: Alec Rothmyer Rivers, Oakland, CA (US); Ilan Ellison Moyer, Belmont, MA (US)

(73) Assignee: SHAPER TOOLS, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,420

(22) Filed: Sep. 28, 2020

(65) Prior Publication Data

US 2021/0026317 A1 Jan. 28, 2021

Related U.S. Application Data

(63) Continuation of application No. 15/178,388, filed on Jun. 9, 2016, now Pat. No. 10,788,804, which is a
(Continued)

(51) Int. Cl.
 *G05B 19/19* (2006.01)
 *B23Q 9/00* (2006.01)

(52) U.S. Cl.
 CPC ............ *G05B 19/19* (2013.01); *B23Q 9/0042* (2013.01); *G05B 2219/36429* (2013.01)

(58) Field of Classification Search
 CPC ............. B27C 5/10; Y10T 409/308624; Y10T 83/089; Y10T 409/308176; Y10T 83/538;
 (Continued)

(56) References Cited

U.S. PATENT DOCUMENTS 5,406,494 A * 4/1995 Schuett .................. G05B 19/41
 700/188
6,073,058 A * 6/2000 Cossen .............. G05B 19/4093
 700/184
(Continued)

FOREIGN PATENT DOCUMENTS

EP 3964902 A1 3/2022
JP H0430970 2/1992
(Continued)

OTHER PUBLICATIONS

Response to Reason(s) for Refusal of JP 2018-34318 dated Oct. 26, 2020 (3 pages).
(Continued)

*Primary Examiner* — Darrin D Dunn
(74) *Attorney, Agent, or Firm* — Almanac IP Advisors LLP

(57) ABSTRACT

A position correcting system, method and tool for guiding a tool during its use based on its location relative to the material being worked on. Provided is a system and tool which uses its auto correcting technology to precisely rout or cut material. The invention provides a camera which is used to track the visual features of the surface of the material being cut to build a map and locate an image on that map used to reference the location of the tool for auto-correction of the cutting path.

19 Claims, 27 Drawing Sheets

Related U.S. Application Data continuation of application No. 14/678,752, filed on Apr. 3, 2015, now Pat. No. 10,078,320, which is a continuation of application No. 13/477,029, filed on May 21, 2012, now Pat. No. 9,026,242.

(60) Provisional application No. 61/639,062, filed on Apr. 26, 2012, provisional application No. 61/488,118, filed on May 19, 2011.

(58) Field of Classification Search
CPC ........ B25F 5/021; B25F 5/00; B23Q 17/2233; B23Q 17/2404; B23Q 15/14; B23Q 17/2414; B23Q 9/0007; B23Q 9/0028; B23Q 9/00; G05B 19/4183; G05B 2219/31027; G05B 2219/31304; G05B 2219/37567; G05B 2219/45127; G05B 19/02; G05B 19/041; G05B 19/29; G05B 19/4163; G05B 19/41875; G05B 2219/31466; G05B 2219/32128; G05B 2219/35162; G05B 2219/35506; G05B 2219/36043; G05B 2219/36346; G05B 2219/36383; G05B 2219/36417; G05B 2219/36503; G05B 2219/37009; G05B 2219/37097; G05B 2219/37404; G05B 2219/37555; G05B 2219/40557; G05B 2219/40571; G05B 2219/42338; G05B 2219/45041; G05B 2219/49392; G05B 2219/50091; G05B 19/19; B25J 19/023; B25J 9/1664; B25J 9/1697; B25J 9/1633; B25J 9/1692

See application file for complete search history.

(56) References Cited

U.S. PATENT DOCUMENTS

| | | | |
|---|---|---|---|
| 10,067,495 B2 | 9/2018 | Rivers et al. | |
| 10,556,356 B2 | 2/2020 | Rivers et al. | |
| 10,795,333 B2 | 10/2020 | Rivers et al. | |
| 2002/0038159 A1* | 3/2002 | Gass | G05B 19/4183 700/108 |
| 2005/0119783 A1* | 6/2005 | Brisson | B33Y 50/02 700/186 |
| 2008/0027580 A1* | 1/2008 | Zhang | B25J 9/1664 700/245 |
| 2008/0115856 A1* | 5/2008 | Altenhoner | B23Q 17/2233 144/136.1 |
| 2008/0232645 A1 | 9/2008 | Billinghurst et al. | |
| 2008/0252726 A1* | 10/2008 | Chan | B23Q 17/2409 348/143 |
| 2008/0302226 A1* | 12/2008 | Fischer | B23D 59/002 83/520 |
| 2010/0042377 A1* | 2/2010 | Seroussi | G06F 30/13 703/1 |
| 2011/0190936 A1* | 8/2011 | Koeder | B23Q 17/2233 700/259 |
| 2011/0282492 A1* | 11/2011 | Krause | B25J 9/1664 700/259 |
| 2013/0089642 A1 | 4/2013 | Lipson et al. | |
| 2016/0052261 A1* | 2/2016 | Goyal | B41J 3/36 347/14 |
| 2019/0362646 A1* | 11/2019 | Hsu | B23K 9/0956 |
| 2020/0230840 A1 | 7/2020 | Rivers et al. | |

FOREIGN PATENT DOCUMENTS

| | | | |
|---|---|---|---|
| JP | H07237107 | 9/1995 | |
| JP | H08120618 | 5/1996 | |
| JP | 2009078210 | 4/2009 | |
| JP | 6866323 | 4/2021 | |
| WO | WO-2010012522 A1 * | 2/2010 | ........... B25H 1/0092 |

OTHER PUBLICATIONS

Response to Reason(s) for Refusal of JP 2018-34318 dated Dec. 28, 2020 (16 pages).

Response to the communication pursuant to Rule 71(3) for EP 13781455.4 dated Jan. 28, 2021 (58 pages).

Notice of Intent to Grant EP 13781455.4 dated Feb. 24, 2021 (97 pages).

Response to the communication pursuant to Rule 71(3) for EP 13781455.4 dated May 5, 2021 (8 pages).

Notice of Intent to Grant EP 13781455.4 dated Jun. 24, 2021 (7 pages).

Notification of Reason(s) for Refusal for JP2020-002753 dated Mar. 30, 2021 (27 pages).

Notice of Allowance for U.S. Appl. No. 16/785,867 dated May 13, 2021 (10 pages).

Reasons for Refusal for JP 2018-34318 dated Dec. 1, 2020 (4 pages).

Notice of Decision of Grant for JP 2018-34318 dated Mar. 30, 2021 (4 pages).

Question from Appeal Examiner regarding JP 2018-34318 and pending claims, received Jul. 12, 2020. (9 pages).

Notification of Reasons for Refusal for JP 2018-34318 dated Sep. 1, 2020 (including Japanese version). (4 pages).

Written response to the summons to attend oral proceedings for EP 13781455.4 submitted Jul. 23, 2020. (111 pages).

Notice of intent to grant EP 13781455.4 dated Oct. 2, 2020. (86 pages).

Extended European search report for EP21204180.0 dated Feb. 4, 2022 (7 pages).

Notification of Reason(s) for Refusal for JP2020-002753 dated Jan. 11, 2022 (7 pages).

* cited by examiner

AUTOMATICALLY GUIDED TOOLS

REFERENCE TO PRIORITY APPLICATIONS

This application is a continuation of prior application Ser. No. 15/178,388, filed on Jun. 9, 2016, which is a continuation of prior application Ser. No. 14/678,752, filed on Apr. 3, 2015, issued as U.S. Pat. No. 10,078,320 on Sep. 18, 2018, which is a continuation of prior application Ser. No. 13/477,029, filed on May 21, 2012, issued as U.S. Pat. No. 9,026,242 on May 5, 2015, which claims priority to U.S. Provisional Patent Application 61/488,118 filed on May 19, 2011, entitled "Automatically Guided Tools" and U.S. Provisional Patent Application 61/639,062 filed on Apr. 26, 2012, entitled "Automatically Guided Tool", the entirety of all of which are incorporated herein by reference.

BACKGROUND OF THE INVENTION

1. Field of the Invention

The present invention relates generally to tools and methods for working on a surface such as woodworking or printing. More particularly, the present invention relates to ways to determine the exact location of a tool in reference to the surface of a material and using the location to auto-correct the tool along a predetermined path such as a cutting path.

2. Description of the Related Art

Current methods and tools that exist to help guide a tool, such as a hand tool, accurately today are premised on minimizing the movement of the tool in one or more directions. Tools that are more difficult to move accurately are guided through the use of mechanical guides such as railings or fences which can be put in place to assist the user in guiding the tool. These fences or guides limit movement since the tool is restricted by the guide. However, existing guide approaches are unsatisfactory, because they take a significant amount of time to set up and because guides do not support complex paths.

If the tool can be accurately positioned freehand, measuring devices may be used to draw visual guides onto the material being used which can then be manually followed. However, such visual guides are still difficult for the user to follow accurately leading to extensive user error in the cutting plan.

Computer numerical control ("CNC") machines or tools alleviate many of these problems by guiding a tool using a computer which has knowledge of the tool's position relative to its set up within the CNC machine and the plan to be followed. CNC machines control movement of the tool to follow the intended path. However, CNC machines are typically expensive, large, and difficult to set up, and most are limited to working with materials that fit within the CNC machine's physical housing.

SUMMARY OF THE INVENTION

An object of the present invention is to provide a system and method for guiding a tool with the precision and flexibility of CNC tools but without the need for CNC's large and expensive hardware. The present invention introduces the idea of a rig or frame with stage which can be positioned on the surface of a piece of material. The present invention can then automatically determine its position on that material and through movement of the stage can accurately move the stage to any coordinate on the material. In some embodiments of the present invention, a digital camera attached to the rig or frame is used to detect the position of the rig and stage. The digital camera can be used to build a map of a piece of material and track the location of the rig and stage on the map. The present invention may include a tool mounted on the stage that can performs work on the surface of the material such as cutting, drilling, sanding, printing or other tasks.

The present invention also provides for controlling the location of the stage, and any attached tool, relative to the material and a design or plan to adjust the stage and tool based on the sensed position. Thus, a user can free hand a design and the present invention will automatically adjust the stage and associated tool to precisely match the design plan and eliminate or minimize human error. The present invention is particularly useful for controlling a router which can be used to cut wood or other materials.

The present invention may make use of computer vision ("CV") technology which allows input from a digital camera to be processed and understood by a computer. The CV technology provides benefits to the present invention in that it provides the ability to determine the location of the rig relative to the material in a fast and accurate manner while being economical from a hardware standpoint. The present invention may make use of one or more CV or sensor based techniques.

The present invention provides a tool for automatically adjusting the location of a working member of the tool comprising: a stage adapted to receive the working member; at least one motor adapted to move the stage; at least one motor controller that controls the at least one motor; a processor in combination with one or more software applications for processing data and providing information to the at least one motor controller; at least one camera adapted for use with the processor for capturing images of a surface, wherein the captured images are processed to build a map of the surface; wherein a subsequent captured image of the surface is processed to determine the location and orientation of the tool relative to the map; and wherein the processor provides information to control the at least one motor to move the stage and working member to a desired location. The location of the working member or the location of the tool are calculated based upon the location at least one of the at least one cameras. The tool may be one of: a router; a drill; a nail gun; a jigsaw, a scroll saw; or a printer. The working member may be one of: a cutting bit; a saw blade, a drill bit, a hammer, or a printer head. The tool may also provide a display screen indicating the location of the working member relative to at least a portion of the map. A design can be loaded into a memory adapted for use with the processor and displayed on the display relative to the map and location of the working member. The design can be processed to determine an intended path for the working member based on the design and the map. The motor controller can, based on information received from the processor, moves the working member to a point on the intended path.

The present invention also provide a tool for automatically adjusting the location of a working member of the tool comprising: a stage adapted to receive the working member; at least one motor adapted to move the stage; at least one motor controller that controls the at least one motor; a processor in combination with one or more software applications for processing data and providing information to the at least one motor controller; at least one sensor adapted for use with the processor for capturing information about a working piece, wherein the captured information is processed to build a map of the working piece; wherein further sensor information is processed to determine the location and orientation of the tool relative to the map; and wherein the processor provides control information to control the at least one motor to move the stage and working member to a desired location. The location of the working member may be determined based upon the location at least one of the at least one sensors. The location of the tool may be determined based upon the location at least one of the at least one sensors. One of the sensors may be a camera.

Further, the present invention provides a rig for automatically adjusting the location of a working member comprising: a stage adapted to receive the working member of a tool; at least one motor adapted to move the stage; at least one motor controller that controls the at least one motor; a processor in combination with one or more software applications for processing data and providing information to the at least one motor controller; at least one sensor adapted for use with the processor for capturing information about a working piece, wherein the captured information is processed to build a map of the working piece; wherein further sensor information is processed to determine the location and orientation of the working member relative to the map; and wherein the processor provides control information to control the at least one motor to move the stage and working member to a desired location. The location of the working member may be determined based upon the location at least one of the at least one sensors. The location of the tool may be determined based upon the location at least one of the at least one sensors. Further, the location of the rig may be based on the location of at least one of the at least one sensors. One of the sensors may be a camera. The tool which mates with the stage may be one of: a router; a drill; a nail gun; a jigsaw, a scroll saw; or a printer. The working member in the rig may be one of: a cutting bit; a saw blade, a drill bit, a hammer, or a printer head. The rig may further comprise a display screen indicating the location of the working member relative to at least a portion of the map. A design can be loaded into a memory adapted for use with the processor and displayed on the display relative to the map and location of the working member. The design can be loaded into a memory adapted for use with the processor, wherein an intended path for the working member is determined based on the design and the map. The motor control information can move the working member to a point on the intended path.

The rig of the present invention can also perform the method of: selecting and registering a design to be rendered; preparing and aligning a position of the tool on the rig; advancing the tool in a first direction and within a selected range substantially adjacent to an outline of the design; and automatically realigning the tool to a boundary edge of the design in a second direction as the tool is advanced in the first direction.

Further, the present invention provides a method of locating a tool on a material, the tool being attached to a stage on a rig, comprising the steps of: selecting and registering a design to be rendered; preparing and aligning a position of the tool; advancing the tool in a first direction and within a selected range substantially adjacent to an outline of the design; and automatically realigning the tool to a boundary edge of the design in a second direction as the tool is advanced in the first direction. Further steps include aligning of a position of the tool is performed by comparing the position of at least one marker disposed on the material to the registered position of the design. Additionally, the selected range substantially adjacent to an outline of the design can be a target range window displaying an illustration of: the tool, an intended cut path and a desired tool movement path that may be different from the intended cut path.

Further, the present invention may automatically realign the tool to a boundary edge of the design in a second direction by a repositioning mechanism, as the tool is advanced in the first direction. The methods of the present invention may automatically realign in response to receiving image data from a camera or in response to the processing of a received capture of an image of a marker on the material.

The present invention also provides a method of cutting a design in a material based on a relative constant speed of movement of a tool, the tool being attached to a stage on a rig, comprising: displaying a target range window rendering an illustration of a point of reference of the tool, an intended cut path and a desired tool movement path that may be different from the intended cut path; aligning and advancing the tool in a first direction at the relative constant speed of movement along the desired tool movement path to cut away the material at the intended cut path; and automatically realigning the tool in a second direction to a boundary edge location of the intended cut path as the tool is advanced at the relative constant speed of movement in the first direction along the design. The target range window may include a target range area that surrounds the point of reference of the tool, a portion of the intended cut path and a portion of the desired tool movement path. The desired tool movement path is in at least one of a clockwise or counterclockwise continuous movement around a perimeter of the design. The design may be a virtual overlay in the target range window. The system may automatically realign a position of the tool based on a comparison of a previous position on the design and a preferred next position on the design. Further, an automatic realigning of the tool to a boundary edge of the design in a second direction may be performed automatically by a repositioning mechanism, as the tool is advanced in the first direction. Further, the automatic repositioning of the tool accounts for the width of a cutting member of the tool relative to the intended cut path. Automatic realigning of the tool may be in response to receiving live feed of image data from a camera.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
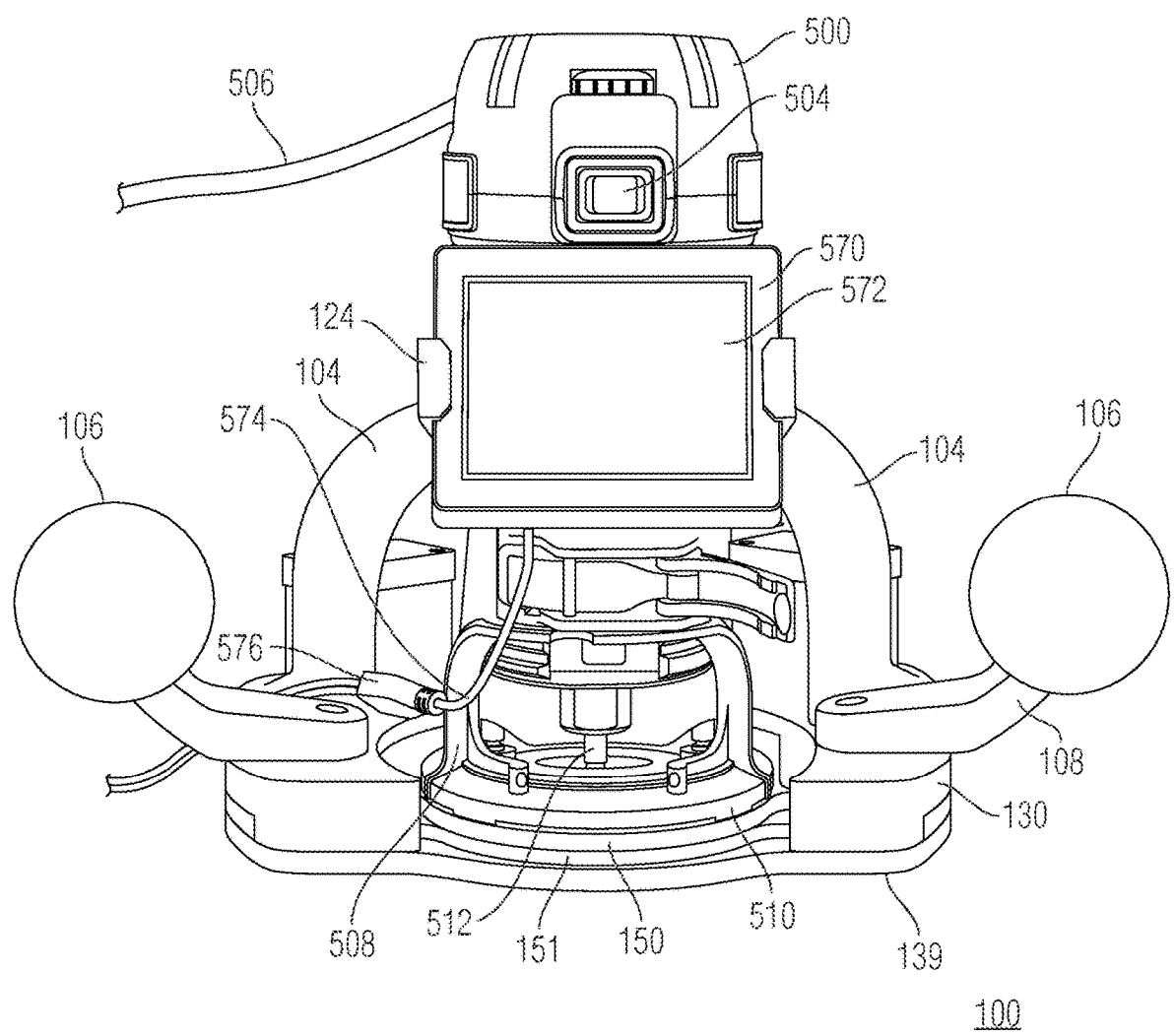
FIG. 1 depicts a front view of an exemplary embodiment of the present invention with a router attached.
Figure 2:
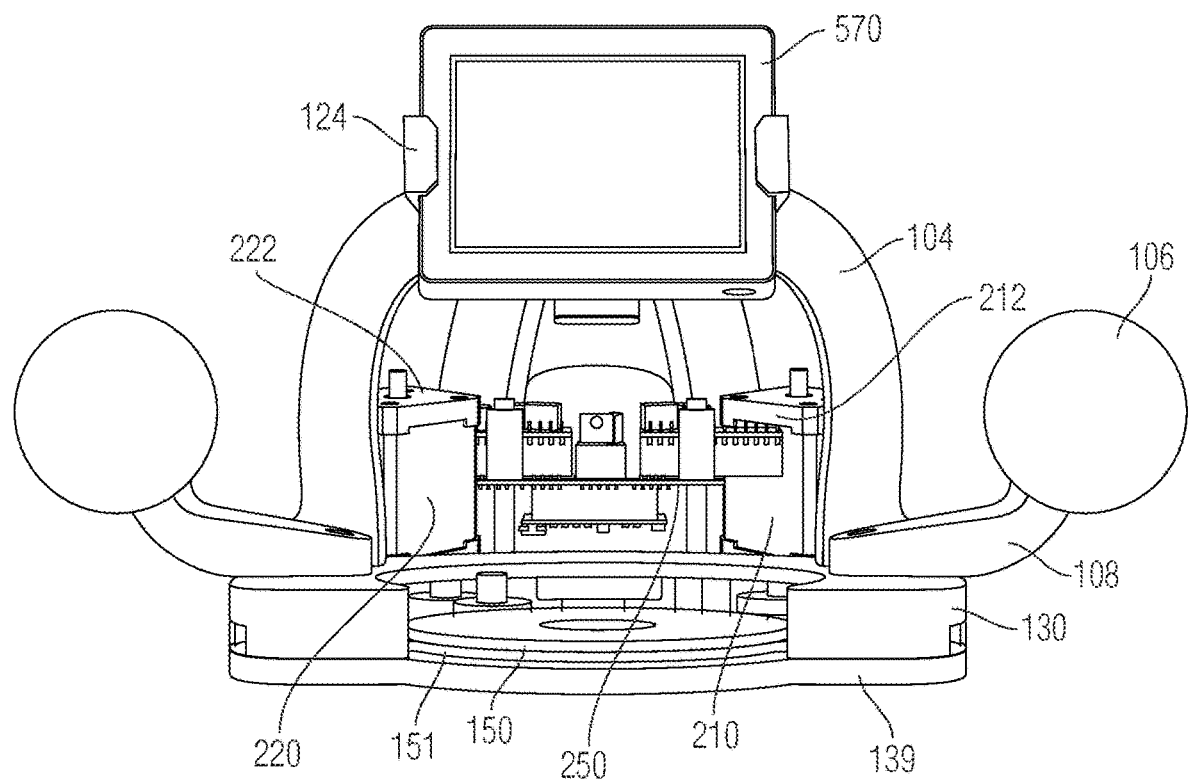
FIG. 2 provides a front view of an exemplary embodiment of the present invention without a tool attached.

Particular embodiments of the present invention will now be described in greater detail with reference to the figures. Like reference numerals apply to similar parts throughout the several views.

This invention overcomes the conventional problems described above by providing a handheld system which can identify the location of a tool, or the rig which contains a tool, relative to the material being worked on and can adjust the tool to the desired location. Therefore, the system can provide a handheld device with a working instrument capable of being operated by hand which can make precision adjustments of the working instrument location based on spatial location to provide an accurate path which the working instrument travels.

Figure 12:
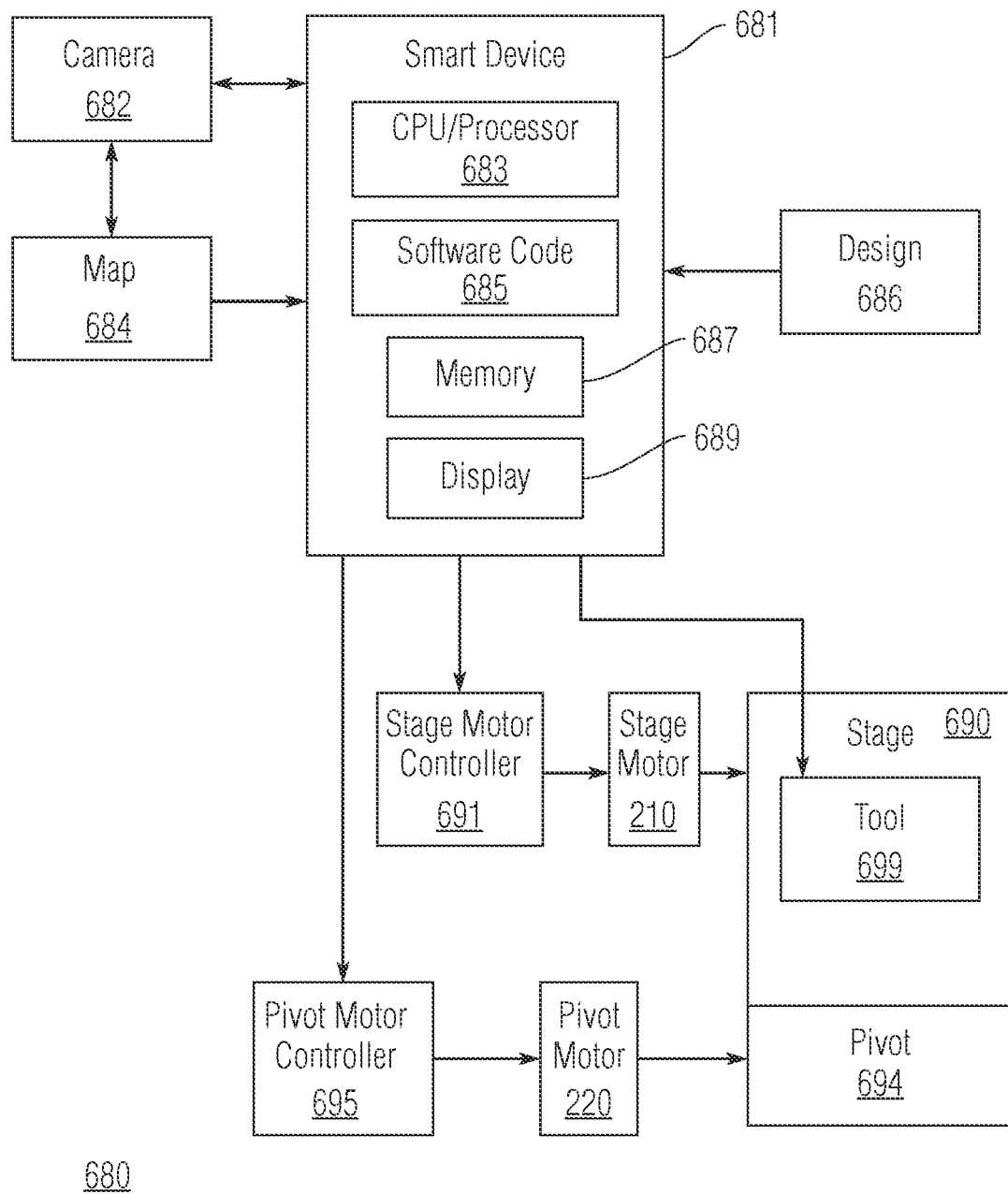
FIG. 12 provides a system element diagram of the present invention.

A diagram of the main system components is best depicted and described in conjunction with FIG. 12. As seen in FIG. 12, a system 680 is provided with a smart device 681. The smart device 681 provides a central processing unit ("CPU") or processor 683, software code 685 which performs one or more processes, memory 687, and a display 689.

The smart device 681 may be one a self-contained unit or may have one or more components separated. For example, the display 689 may be tethered to the smart device 681 or integrated into the housing of the smart device 681. Likewise, the smart device 681 may be integrated as part of the system 680 so that the system is a self contained portable unit. The system 680 also includes a camera 682 which is used in combination with the smart device 681 to build a map 684 of the material to be worked on. The map 684 may be built in various ways including using computer vision ("CV") and sensors. One CV technique that could be employed is using or building a photo mosaic. A photo mosaic process including taking multiple photographs of different parts of the same object and stitching them together to make one overall image covering the entire object.

Another technique which may be employed is simultaneous localization and mapping ("SLAM"). SLAM makes use of a sensor that in combination with a processor 683 and related software 685 is able to build a map 684 of the material being worked on while simultaneously determining the location of the tool 699 relative to the map 684.

Specifically, after the map is built the camera 682 continues to capture images of the material being worked on which are fed to and processed by the smart device 681 to constantly determine the location of the tool 699 or rig. The captured images are analyzed against the map 684 to determine the geo location of the camera 681 relative to the material. Once the location of the camera 682 is determined, the location of the rig is then a known offset from the camera 682 position as the camera 682 is rigidly attached to the rig. The location of the tool 699 relative to the rig is then computed from the current orientations of the motor shafts. The orientations of the motor shafts are known by "homing" them once and then tracking all steps taken since the homing process. Alternatively, encoders could be used instead of homing as the encoders would be able to tell the orientations of the shafts directly. Through the offsets and calculations, the system can identify the location of the tool 699 or rig relative to the material being worked on. The captured images which are analyzed against the map 684 may include characteristics of the material such as wood grains and deformations or may include markers placed on the material. Different aspects of the mapping and location technology will be described in more detail below.

The user may then input or load a design 686 or template into the smart device 681, adjust the size of the design 686 relative to the map 684 of the material to provide the user with a desired working path on the material being worked on.

In operation, as the system or rig 680 is moved by the user along the material being worked the smart device 681 processes the captured images from the camera 682, determines the location of the rig 680, and provides a desired path to the user on display 689. Once the user has placed the rig 680 close to the desired path the rig or system 680 automatically adjusts the position of the tool 699 to achieve the precise working path stemming from the loaded design 686. The term "rig" and "system" are used interchangeably in the description of the present invention. However, the rig primarily refers to the physical device itself including all attachments. The system refers to the physical device, all attachments, and all related technology and software code embedded or included in some of the physical elements.

The system 680 adjusts the precise location of the tool 699 by adjusting the geo location of the stage 690 or a moveable platform that the tool 699 is attached to. The stage 690 is connected to an eccentric coupled to a motor shaft. As the motor shaft moves in a circular path the eccentric moves the stage 690 in complex arcs and paths. A pivot 694 is connected to the stage and is also connected to an eccentric coupled to a second or pivot motor shaft. The pivot 694 is able to pull or push the stage 690 to achieve controlled movement of the stage within a 360 degree range. The ultimate effect is that the eccentrics can be rotated to position the stage in almost any XY position in the range.

The system 680 may use a reference lookup table which provides motor coordinates related to stage positions, or uses calculations to adjust the motors and move the stage 690 and the cutting bit of the tool 699 connected to the stage 690 to the desired location. Further, the tool 699 through movement of the stage 690 and pivot 694 is capable of movement in 360 degrees of movement in a two dimensional plane. Essentially, the cutting instrument of the tool can be moved anywhere within the 360 degree window of the target range 408 (see FIG. 15).

In the exemplary embodiment, the stage 690 and pivot 694 are moved by electric motors. The stage motor 210 is controlled by a stage motor controller 691 and the pivot motor 220 is controlled by a pivot motor controller 695. The stage motor controller 691 and pivot motor controller 695 receive information on the desired location or coordinates from the smart device 681. Based on the received information the stage motor controller 691 and pivot motor controller 695 activate and control their respective motors 210, 220 to place the stage 690 and the pivot 694 in the proper position which places the tool in the desired geo location.

The smart device 681 may also communicate with, receive information from, and control the tool 699. Such control could include sending instructions to power on or off, increase or reduce speed, when to engage the material being worked such as adjusting the depth of the tool 699 when the user is close enough to or near the desired path on the material.

The form and structure of an exemplary embodiment of the present invention for use with a cutting tool is provided and depicted in FIGS. 1-9. The exemplary embodiment of the present invention depicted in FIGS. 1-9 provides a system or rig 100 which is configured for use with a router 500. The system 100 includes two support legs 104 which are attached to a base housing 130 on the lower end and terminate into a device mount 122 at the upper end. The device mount 122 includes left and right display clips 124 to clamp or lock the monitor or smart device 570 into the device mount 122. The device 570 includes a display screen 572 for the user to view the cutting path for that particular use. The base 130 also has left and right handles or grips 106 attached through handle support arms 108.

Figure 8:
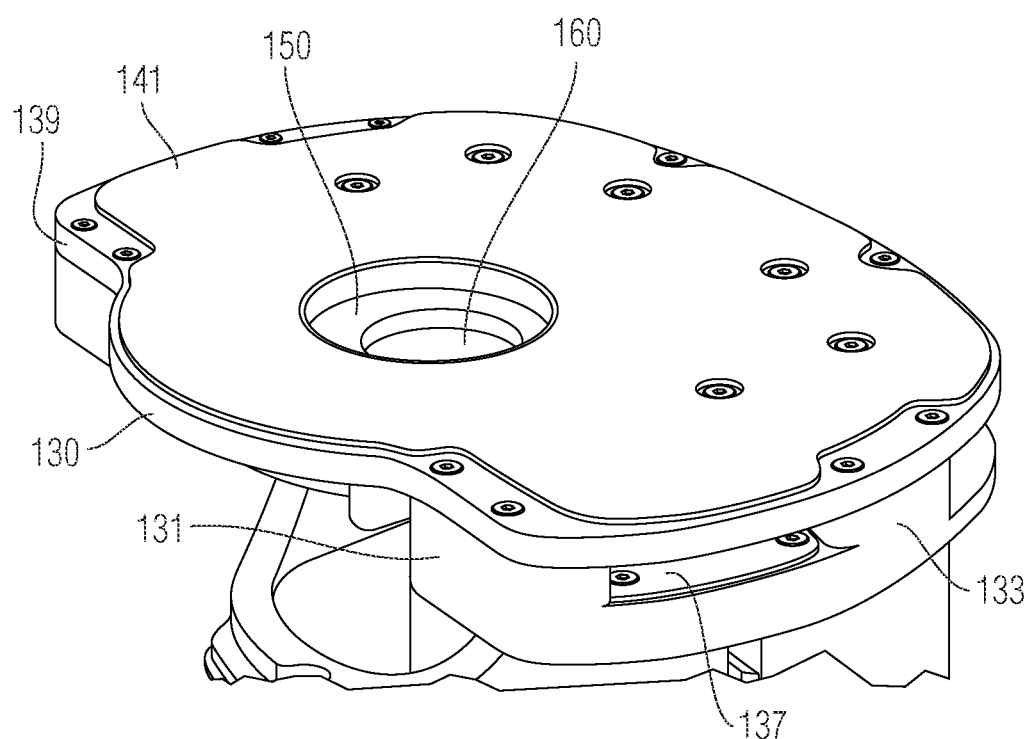
FIG. 8 provides a perspective view of the bottom of an exemplary embodiment of the present invention without a tool attached.

The lower end of the base 130 has a bottom plate 139 which encloses the stage 150 and a lower stage skid pad 151. The base 130 and bottom plate 139 are fastened to one another such as by machined screws. As seen in FIG. 8, the bottom plate 139 has a bottom skid pad 141 attached to the bottom. The bottom skid pad 141 is used to assist movement of the rig 100 along the surface of the material being worked on. The bottom skid pad 141 may be made of a high density polyethylene, Teflon, or other suitable material which is both durable and suited for sliding along the material.

Figure 9:
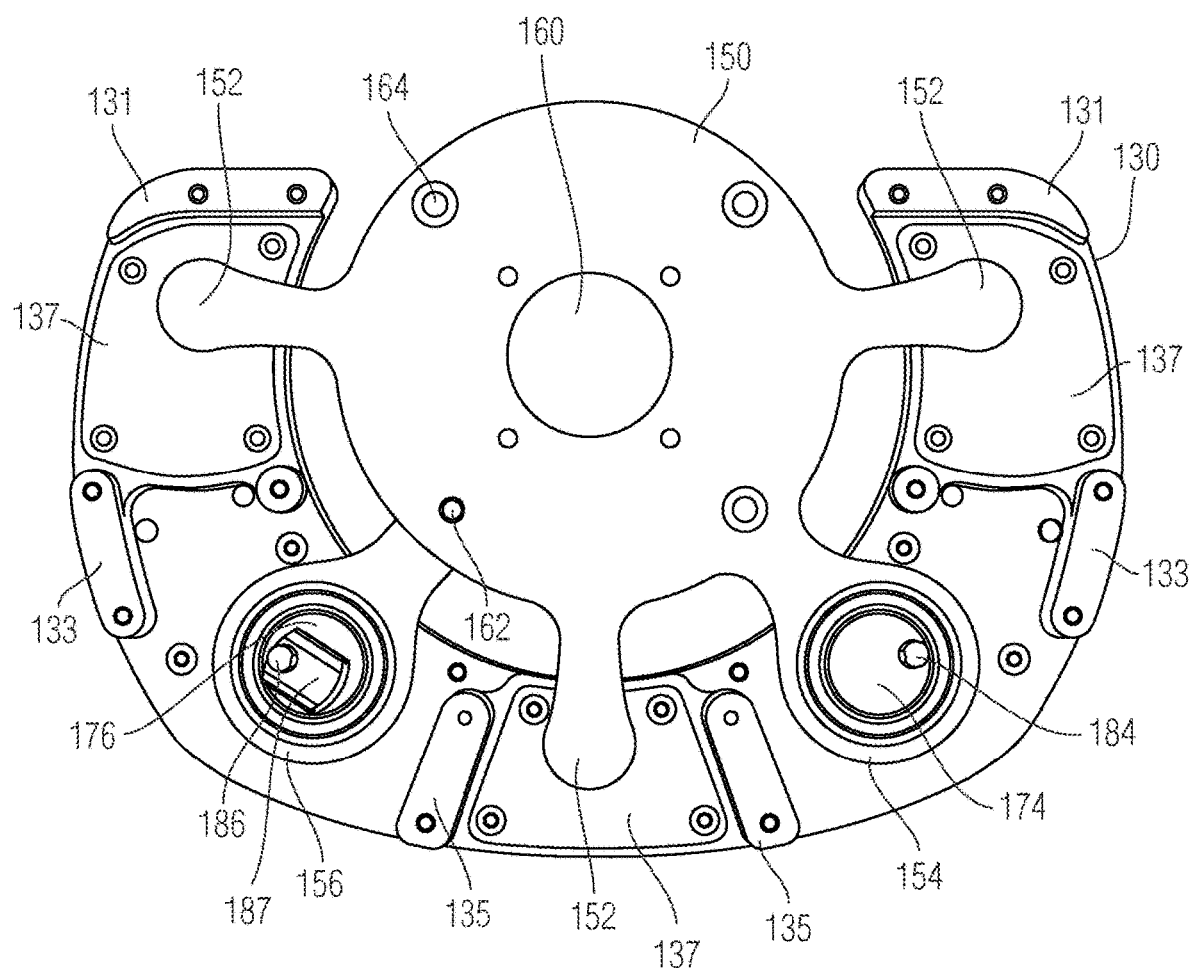
FIG. 9 provides a bottom view of the internal stage and pivot components an exemplary embodiment of the present invention.

The router 500 is added to the rig 100 by attaching the router base plate 510 to the stage 150. As seen in FIG. 9, the stage 150 has several tool attachment points 164 for attaching the router base 510 to the stage 150. The router base 510 has several router base support legs 508 which forms a cage around the router bit 512. The router 500 also has a power cord 506 and an on-off switch 504. As mentioned previously, the rig 100 may be implemented as a self contained portable unit including an on-board source of power, such as a battery source.

The smart unit or monitor 570 has an input cable 574 with a cable terminal or receptacle 576. If the device is a smart unit the CPU, software, and memory will be on the device itself. If the device 570 is simply a monitor then the cable 574 and receptacle 576 will connect to the CPU unit.

As best seen in FIGS. 2-7, the system 100 contains a stage motor 210 and a pivot motor 220. The stage motor 210 is used to control movement of the stage 150. The pivot motor 220 is used to control movement of the pivot arm 156 which pulls or pushes the stage 150 to convert the rotational motion of the motors 210, 220 into a relatively linear motion. The stage motor 210 and pivot motor 220 each have their own motor cap 212, 222 respectively.

The motors 210, 220 are controlled by the stage motor driver 253 and the pivot motor driver 254 which are connected to the printed circuit board 250 and the microcontroller board 252. The microcontroller 252 processes low level instructions from the smart device or CPU unit (i.e. a laptop). The instructions would be instructions to move the motors 210, 220 to set positions (i.e. positions 150, 125) into the correct step commands to drive the motors to those positions. The motors' orientations are tracked by homing them to a zero position once and then tracking all subsequent steps taken. Alternatively, the system could use rotary encoders to keep track of the state of the motor shafts' orientations. The motors 210, 220 and the motor drivers 253, 254 are powered by connecting the power plug receptacle 255 into a power source.

Figure 3:
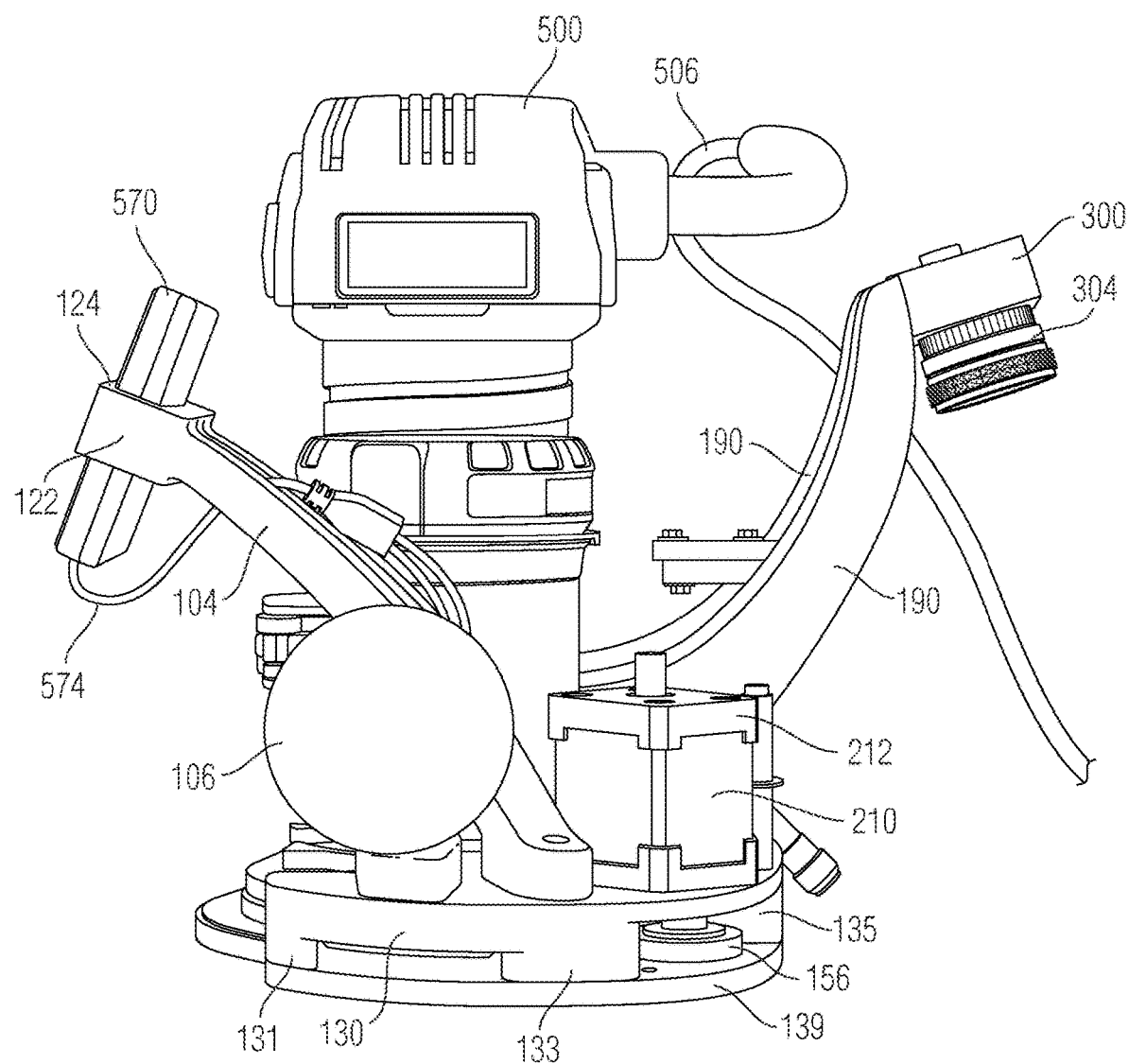
FIG. 3 provides a side view of an exemplary embodiment of the present invention with a router attached.
Figure 4:
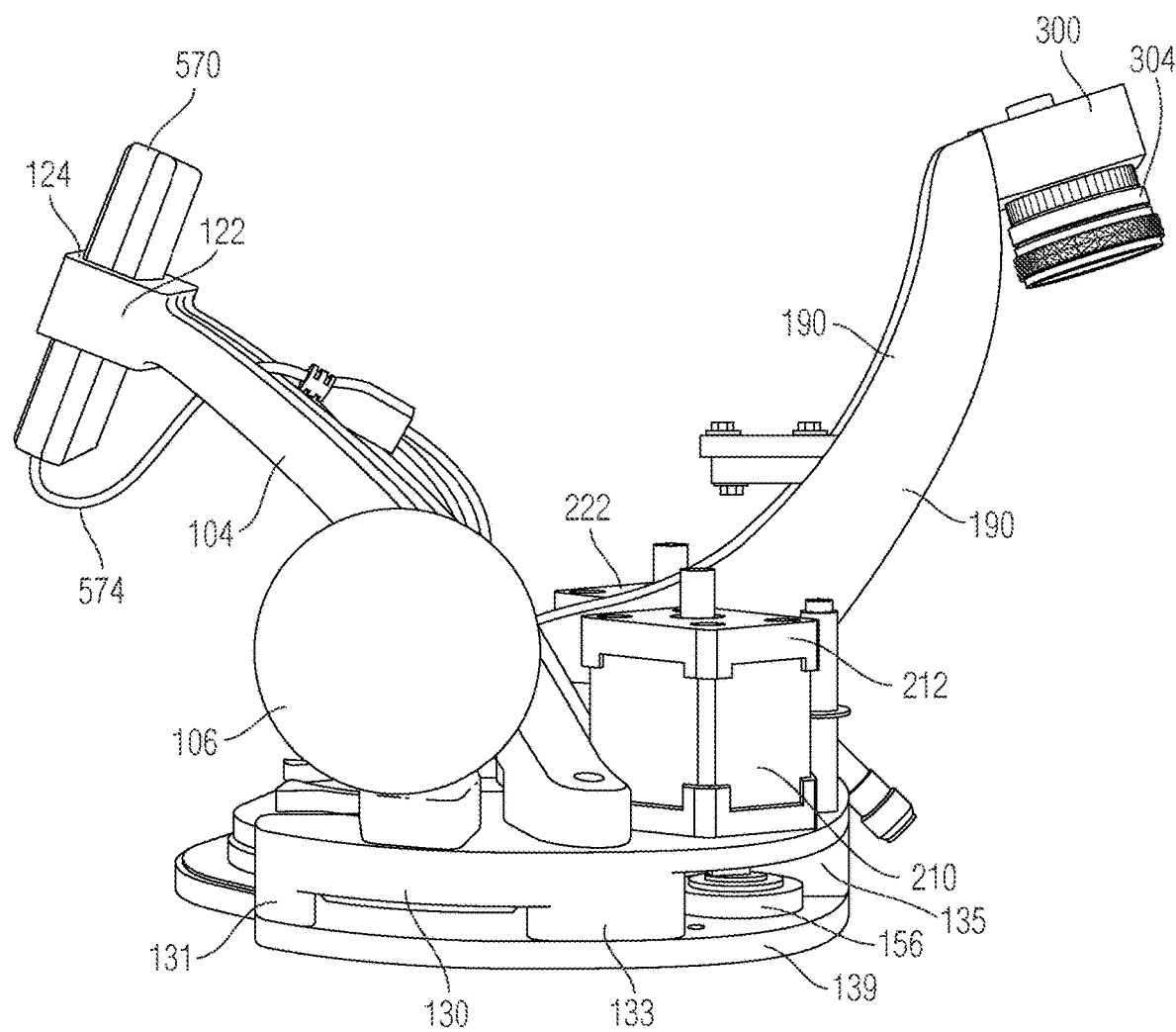
FIG. 4 provides a side view of an exemplary embodiment of the present invention without a tool attached.
Figure 5:
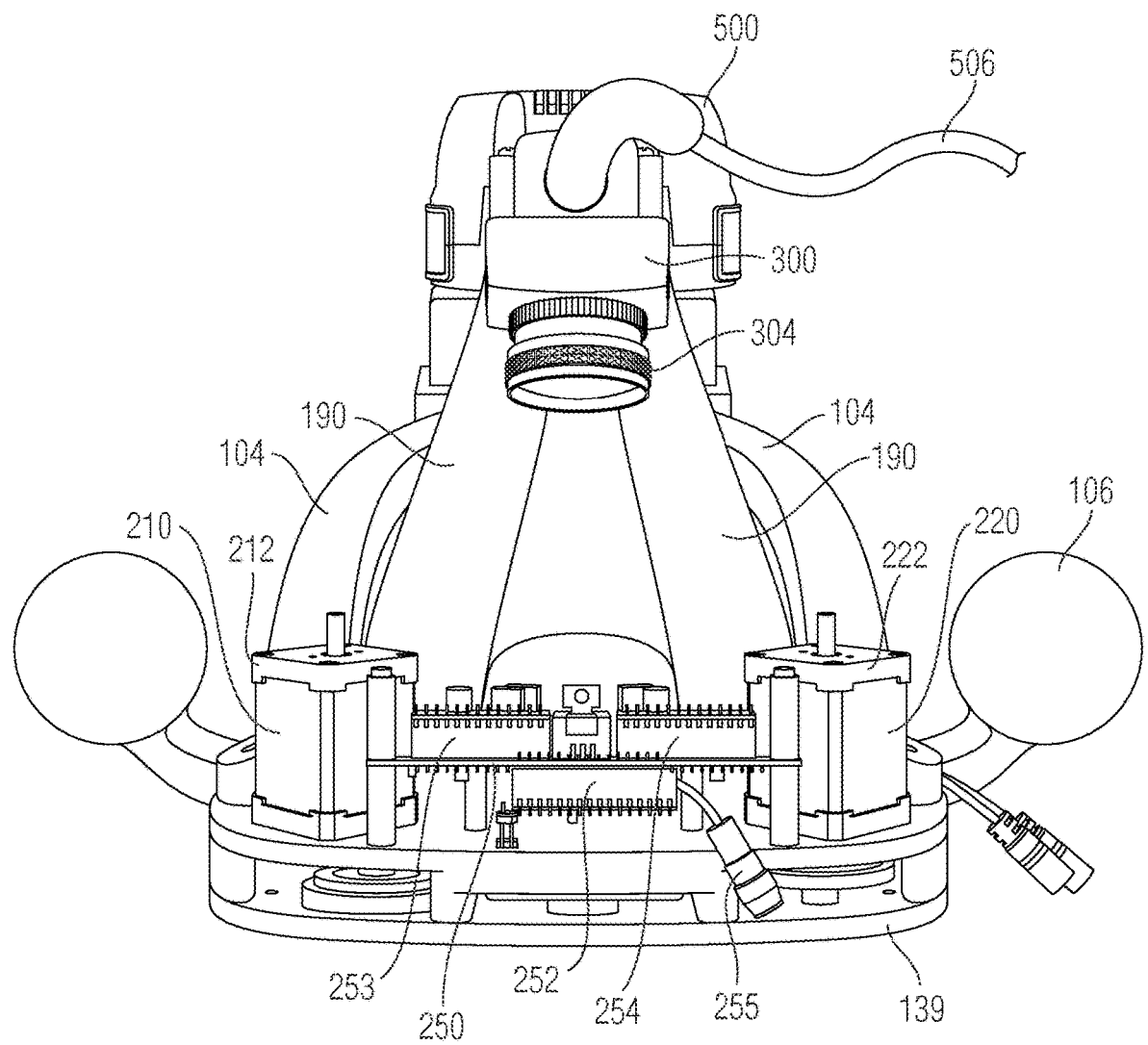
FIG. 5 provides a rear view of an exemplary embodiment of the present invention with a router attached.
Figure 6:
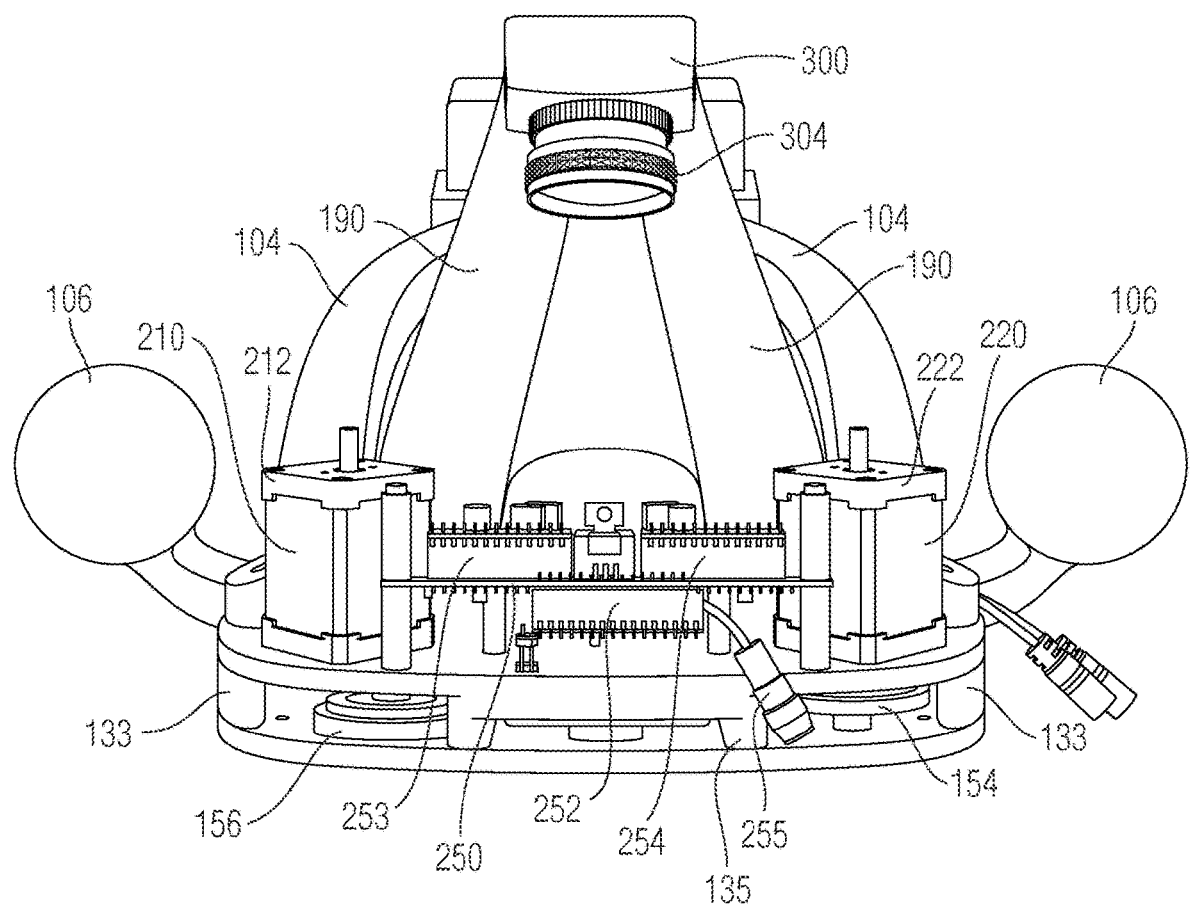
FIG. 6 provides a rear view of an exemplary embodiment of the present invention without a tool attached.
Figure 7:
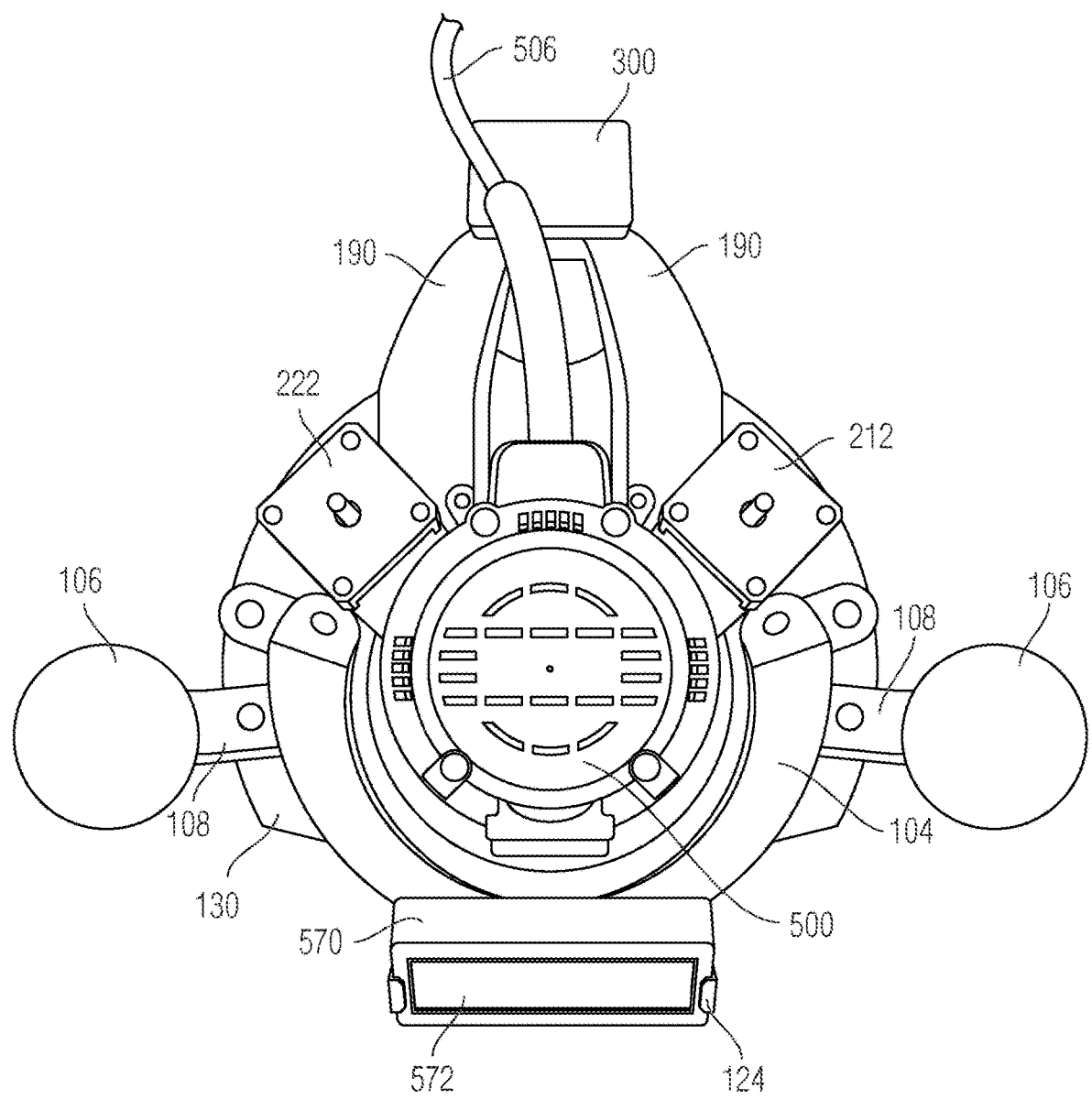
FIG. 7 provides a to view of an exemplary embodiment of the present invention with a router attached.

As seen in FIGS. 3-4, the back of the rig 100 includes a camera support 190. The camera support 190 may be one or more support members which are connected to the upper stage housing 130 and terminate at the top of the rig 100 where a camera 300 is mounted. The camera 300 and a lens 304 are placed in a relatively downward position to capture images of the material being worked and the surrounding areas thereof.

In this exemplary embodiment, eccentrics were used to convert the rotational motion of the motors into linear motion. Eccentrics are circular disks rotating around an off-center shaft. As the shafts are rotated, they produce linear motion in the collars wrapped around the eccentric disks. Eccentrics are able to maintain the same low backlash accuracy of a precision linear stage while being less expensive. A linear displacement range of ½" is well within the capabilities of an eccentric. The present exemplary embodiment consists of two eccentrics mounted to the frame and connected to a stage that can slide on its base. The eccentrics are rotated by stepper motors, and by rotating them the stage can be moved within the frame. The size and shape of the various eccentrics can be varied to provide larger or smaller relative movement of the tool 699 relative to the workspace.

To properly constrain the stage, one eccentric is connected directly to the stage by a ball bearing coupling, while the other is connected by a coupling and a hinge. This linkage design results in a nonlinear relationship between eccentric orientation and stage position. Near the center of the range moderate rotation of an eccentric produces moderate motion of the stage. In contrast, near the edge of the range much larger rotations are necessary to move the stage a fixed amount. In the present invention, stage displacement is limited to approximately 95% of the maximum range to avoid positions with extreme nonlinearity. This linkage design also permits back driving, in that forces acting on the tool can cause the cams to rotate away from their target positions. However, the present invention makes use of adequately powered motors which have sufficient power to preclude back driving even in the presence of significant forces.

As seen in FIG. 9, the upper stage housing 130 is a one piece unit with spacers 131, 133, 135 machined or formed into the upper stage housing 130. The spacers 131, 133, 135 provide the required space for the stage 150 and pivot arm 156 to move. The front spacers 131, side spacers 133, and rear spacers 135 need not be formed as one unit. Instead, the front spacers 131, side spacers 133, and rear spacers 135 could be separate pieces attached to the upper stage housing 130. The upper stage housing 130 also accommodates several upper stage skid pads 137. The upper stage skid pads 137 allow the stage stabilizing arms 152 to move along the pads 137 with minimal friction.

The stage 150 is ideally made of a light but durable and strong material such as aluminum or some other alloy. The stage 150 is most likely machined to include one or more stabilizing arms 152, the stage eccentric arm member 154, tool attachment points 164, and an opening 160 where the tool extends through the stage 150. In addition, a pivot arm 156 is most likely machined from the same alloy or material as the stage 150.

In operation the stage motor 210 moves in response to rotation of the stage motor shaft 184. There is a stage eccentric cam member 174 attached to the stage motor shaft 184. When the stage motor shaft 184 rotates the stage eccentric cam 174 rotates and the cam design causes the stage arm member 154 connected to and surrounding the cam 174 to move the stage 150. A bearing ring may be used between the cam 174 and the stage arm member 154.

Additionally, when the pivot motor 220 moves the pivot motor shaft 186 rotates. There is a pivot eccentric cam member 176 attached to the pivot motor shaft 186. When the pivot motor shaft 186 rotates the pivot eccentric cam 176 rotates and the cam design causes the pivot arm member 154 connected to and surrounding the cam 176 to move the pivot arm 156 back and forth which causes the stage 150 to move relative to the pivot arm 156. A bearing ring may be used between the cam 176 and the pivot arm 156.

As the stage 150 and pivot arm 154 move, the stage stabilizing arms 152 move along the upper stage skid pads and the lower stage skid pad 151 (see FIG. 1) to stabilize the stage 150 during movement. Further, the stage eccentric 174 and pivot eccentric 176 include a boss. The boss gives the eccentric 174, 176 some extra material to house the set screw which clamps on the stage motor shaft 184 or pivot motor shaft 186, thus securely attaching it to the respective eccentric 174, 176. The pivot eccentric boss 187 is seen in FIG. 9. The stage eccentric boss is not shown in the figures as it is flipped relative to the pivot boss 187 because the stage 150 and the pivot arm 156 are operating on different planes.

Figure 15:
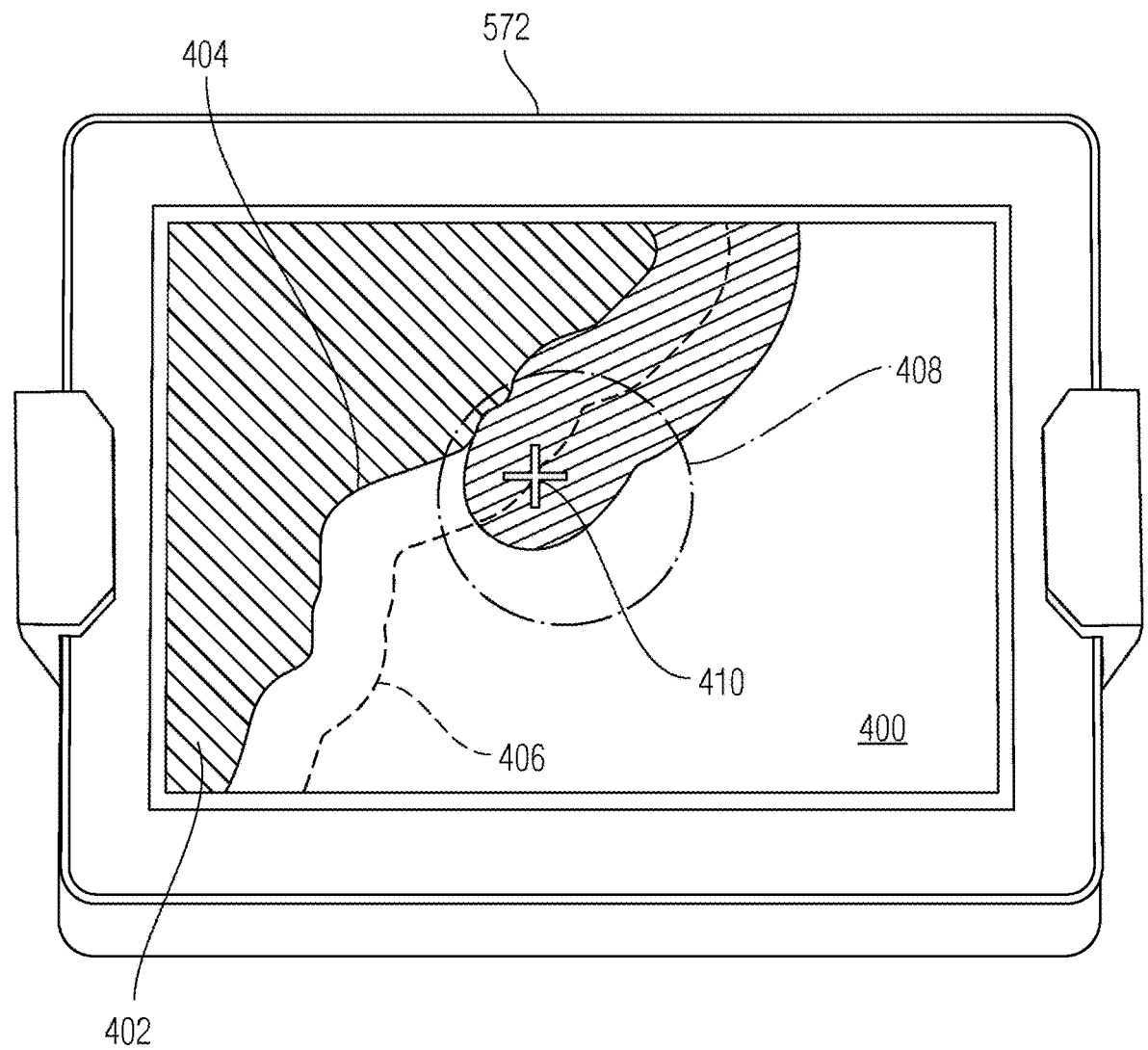
FIG. 15 provides a representation of the graphical user interface provided on the display of the system.

By way of example, FIG. 15 depicts the monitor or display 572 as the user pulls or pushes the rig 100 using the handles 106. The router bit 512 (as shown by the crosshairs 410) of the router 500 cuts the material 400 being worked on. The user sees the intended path 404 (as shown in solid lines) of the design on the display 572 of the monitor or smart device 570. The display 572 shows the desired path 406 as well as the target range 408. The target range 408 is related to the range of movement of the stage 150 and correspondingly the attached tool. Thus, if the range of movement of the router is generally 0.5 inches in any direction from its center point then the target range 408 would best be defined as a circle with a one inch diameter since the router bit can only move 0.5 inches from the center point. Thus, the user would need to move the router bit 410 within 0.5 inches of the intended path 404. Once the intended path 404 is within the target range 408, the CPU would automatically identify a target point on the intended path 404. The CPU would send instructions to the motor controllers to move the stage 150 to the appropriate coordinates which correspond with the bit 410 reaching the target point and cutting along the intended path 404. It's important to note that the system can account for the width of the cutting bit 410. If the system were to place the router bit 410 directly on the intended path 404 the width of the router blade would cause the router to remove material 402 beyond the intended path 404. The system accounts for the width of the cutting bit 410 by setting the desired path 406 some distance from the intended path 404 so that the bit 410 only takes out material up to, but not beyond, the intended path 404. Since cutting elements or bits have different widths the system can be adjusted to remove or vary the bit width adjustment or the gap between the intended path 404 and the desired path 406.

As the system cuts or reaches one target point, the system would identify a next target point and continue in this process cutting along the intended path 404 in a clockwise direction. The user would continue to pull or push the rig 100 via the handles 106 keeping the intended path 404 (a line or area) within the target range 408 as seen on monitor 572. A more detailed flow and process is described in conjunction with FIGS. 10 and 11.

Figure 10:
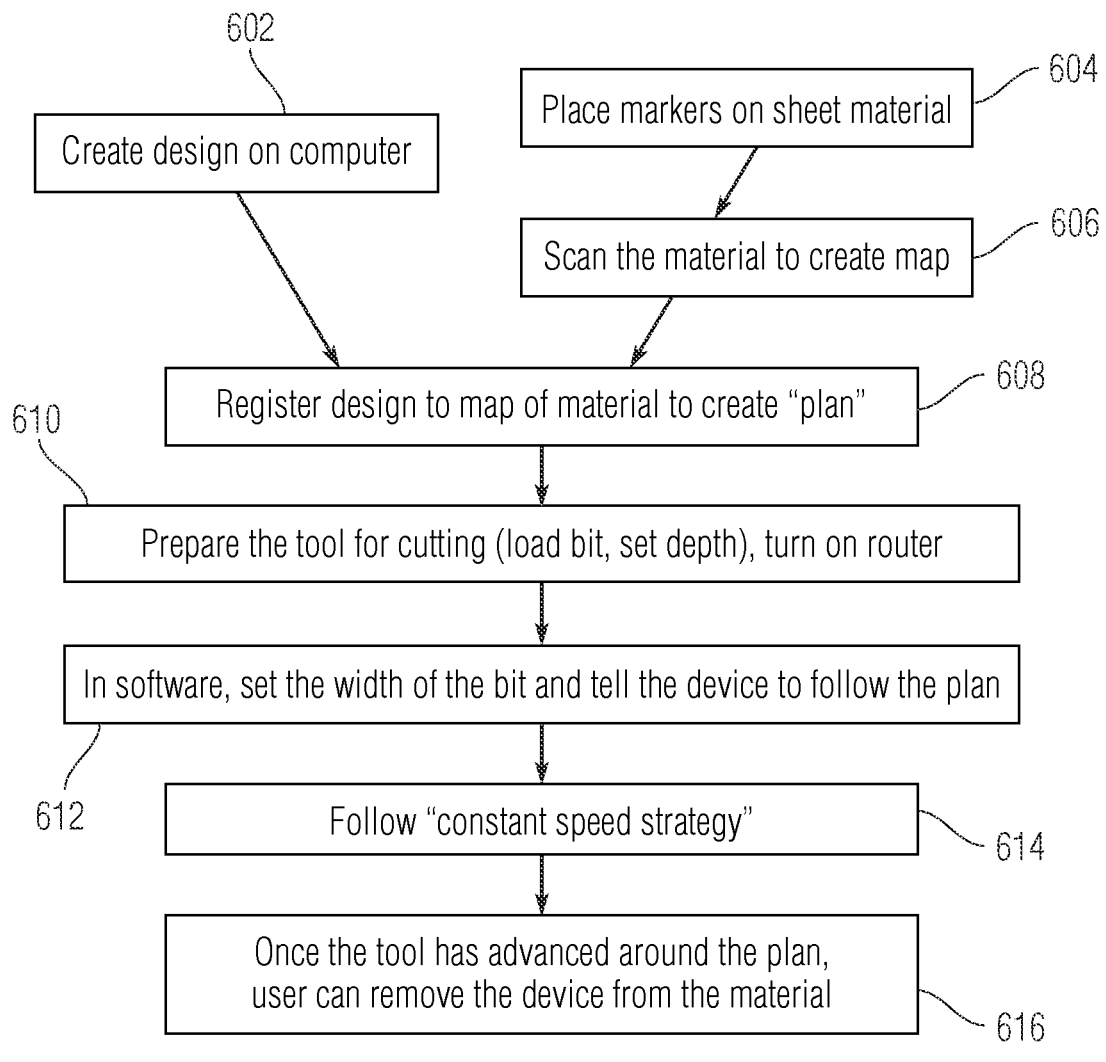
FIG. 10 provides a flow chart of the steps performed by the present invention during operation.

FIG. 10 provides a flow chart showing the steps or method 600 for cutting a working surface using the router based embodiment of the present invention. First in step 602 the user would find or create a design they want to cut out of a material. The user would then need to map the sheet of material. If the material has enough markings the user could use the material itself. However, in step 604, if the material has a flat surface or limited markings the user can place markers on the material. Such markers might include printer marker stickers and/or any other type of suitable indicia capable of being readily identified.

In step 606, the user uses the camera technology to scan the material and the various markers to create the map. The CPU processes the images captured by the camera and generates the map. The size and shape of the map can be appropriately manipulated to a preferred configuration. The design is then registered to the map to create a cutting plan (step 608).

In step 610, the user prepares the cutting tool by loading, adjusting, or securing the bit, mounting it to the rig and turning the router on. In the alternative, and as mentioned previously, it is to be understood that the turning on of the router can be a software initiated process in response a variety of parameters, as opposed to a mechanical switch, such as motion sensing of a movement of the rig 100 in a particular direction by the user, or the like.

In step 612, the user may set a few elements, such as width of the bit of the cutting tool, the range of the tool's desired range correction, the size of the cross-hair, the speed of the cutting tool, and the like. Thereafter, instructions may be provided to the software to begin.

In step 614, the rig is placed adjacent to the desired path so that the system can automatically adjust the position of the tool into a starting adjustment range position along the desired path. The user then follows the "constant speed strategy" as will be described in more detail with regards to FIG. 11. Once the tool has advanced fully around the plan (step 616) the user can remove the device and work product from the material.

Figure 11:
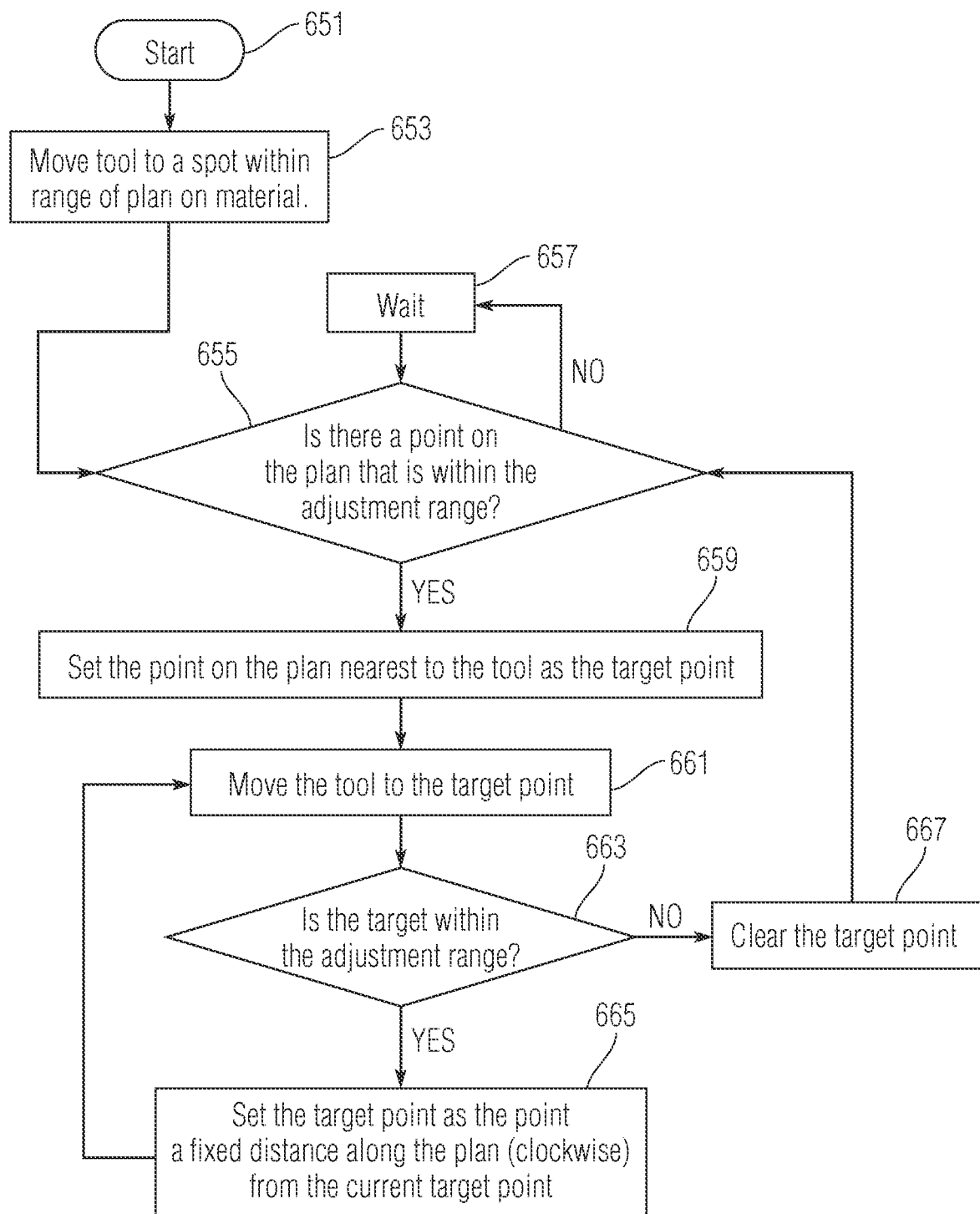
FIG. 11 provides a flow chart of the steps performed by the present invention during the constant speed process.

FIG. 11 provides a flow chart of method 650 for the constant speed strategy. The process in FIG. 11 assumes the user already has the router attached to the jig and has mapped their material and loaded up their design. The user then starts (step 651) the process to cut the material.

In step 653, the user must move the tool to a spot within the range of plan or path on the material. Once the user has moved the rig with the router tool to a spot within range of the intended path, the system in step 655 determines based on its location if there is a point on the plan within the adjustment range of the rig. If not, the system in step 657 may send a notification and waits until the user moves the device within the adjustment range.

In step 659, if there is a point within the adjustment range the system sets the point on the plan nearest to the tool as the target point. The system in step 661 then moves the tool to the target point and cuts the material.

The system then attempts to create a second target by determining in step 663 if a new target is within the adjustment range. If there is a second target, the system in step 665 sets the second target point as the new target and the device continues to move in a clockwise direction cutting from the old target point to the new target point. As the tool or router is cutting from the old target point to the new target point it is also attempting to identify the next target point within the adjustment range (step 663). The determination of an optimum second target may be continuous, and based on the image, or various images, detected from the camera and processed by the system.

If not, the system (in step 667) clears the target point and starts back at step 655 to determine if there is a point on the plan within the adjustment range. This process continues until the tool has gone through the entire plan in a particular direction, such as a clockwise direction.

As previously discussed above, FIG. 12 provides a system diagram of the main components of the present invention. The system 680 makes use of a smart device or system 681 which includes a CPU 683, software code 685 which performs one or more processes, memory 687, and a display 689. The smart device 681 may be one contained unit which mounts onto the display mount 122, 124 or may have one or more components separated but connected. For example, the system may be connected to a laptop or remote CPU 683 which contains the software code 685 and memory 687 yet is tethered to a monitor 689. The monitor 689 may mount to the display mount 122, 124.

The camera 682 is used to build a map 684 of the material to be worked on as well as determine the location of the rig 100 on the material. As discussed, the system may use CV technology and other sensors to build a photo mosaic map 684 of the material or could use the SLAM process. SLAM makes use of a sensor that in combination with a processor 683 and related software 685 is able to build a map 684 of the material being worked on while simultaneously determining the location of the tool 699 relative to the map 684.

Through the present invention, as previously described, the system 680 is able to locate a tool 699 or the working bit of a tool 699 on the surface of a material being worked. The system 680 is able to locate the tool 699 on the material using a camera 682 positioned some distance away from the material based on looking and or mapping at the material. In one implementation, the camera 682 is first used to build a map 684 of the material and is then used to locate itself (or the tool) on the map 684.

The map 684 can be built by having the user sweep the camera 300 in an arbitrary path over the surface of the material until the entire area of interest has been covered. The camera 682 can be removed from the rig 100 for this step. The images from this sweep are then stitched together by the CPU 683 using the image mosaicing software code 685 to form a cohesive map 684 of the area of interest of the surface of the material. Then, the user can return the camera 300 to the rig 100. Once the map 684 is formed and saved in memory 687 whenever the camera 682 takes an image of the material it has mapped, it can be matched against the map 684 held in memory 684 and its position and orientation determined.

This process may have an extra step in allowing the user to create and load a design 686. After the map 684 has been assembled on the smart device 681 (such as a computer), the user may create a design 686 on the computer by plotting it directly on the generated map 684. For example, the user may mark positions on a piece of wood where a drill hole is desired. All the techniques and features of the software code 685 (include computer aided design and manufacturing) can be employed to create a design with accurate measurements. Then, when the user returns to the material, the position of the camera 682 on the map 684 can be displayed on a screen or display 689 to the user, with the design plan 686 overlaid on the map 684. Essentially, the system 680 is able to identify the geo location of the tool relative to the map. So, in the example of drill holes, the camera 682 could be attached to a drill and used to determine the position of the drill exactly relative to the target drill locations specified in the design 686, enabling the user to line up the drill precisely.

A significant advantage of such a system is that it eliminates measurement mistakes, as all measurements are performed on the computer 681. Measurement is traditionally one of the most common sources of error and such error would be negated by the present mapping and location aspects of the present invention.

Although described herein in combination with a router and separately with a drill bit, the camera 682 could be attached to any tool 699 to provide positioning for that tool 699. The camera 682 could also be coupled with a display 689 and CPU 683 and become part of a computer or smart device 681 that can be attached to any tool 699. Further, a software application or code 685 could be installed on a mobile Smartphone (such as an iPhone) utilizing the camera, CPU, memory, and display already part of the Smartphone.

The system may perform the mapping and positioning steps simultaneously (i.e. "SLAM", Simultaneous Localization and Mapping) and the system 680 may use a video or still camera 682. The camera 682 may be directed downward at the surface of the material, it could be positioned at any angle, and it could sit at any vantage point on the tool 699 or rig 100 (FIG. 1).

During the phase when the camera 682 is being used to locate itself on the material, having low lag between moving the camera 682 and detecting that movement can be important. One way to decrease lag is to use a high-frame rate camera 682. However, these can be expensive. An alternative is to use a relatively low-frame rate camera 682 coupled with one or more optical sensors such as are present in optical mice. The optical sensors provide low-latency dead reckoning information. These sensors could be used in conjunction with the camera 682, for example in a configuration where the camera 682 provides accurate global position information a few times a second and appreciable lag, and the optical sensors are used to provide dead-reckoning information with low lag that fills in the time since the last image was taken. The system could also make use of multiple cameras to increase the accuracy or range of coverage when scanning, or to provide depth information.

There are also numerous options for creating, capturing, or loading the design 686. Designs could be downloaded or otherwise obtained from others including by purchasing designs online and uploading to the smart device or computer 681. Rather than creating the design 686 on a separate computer and then uploading to the device 681 the system 680 could be used to capture a map not only of the surface but of the design 686 on that surface. This could be useful for setting up the system 680 to follow a specific line or to show the user an image of the surface of the material underneath a large tool which obstructs sight, or to show the surface with a drawn plan in a pristine state before it is covered with debris or the surface on which the plan is drawn is cut away. Alternatively, the design 686 could be designed, altered, or manipulated from its original form on the device 681 through a menu driven interface allowing the user to input distances, angles, and shapes or to free hand a drawing on a touch sensitive pad or display.

In an exemplary embodiment, the software 685 is able to build the map and track the camera's position using visible features of the material such as grains, imperfections, and marks. However, some materials, such as solid-colored plastic, may be too undifferentiated for this to work. In these instances, the user may alter the material surface in some way to add features that can be tracked. There are many possible ways this could be done: the user could apply ink to the material that is typically invisible, but which can be seen either in a non-visible spectrum or in the visible spectrum when UV light is applied (or similar), allowing the camera to track the pattern of the invisible ink while not showing any visible markings once the work is done. Alternatively, the user could apply stickers with markers which can later be removed. Features could also be projected onto the material such as with a projector. Or, if the user will later paint over the material or for other reasons does not care about the appearance of the material, the user could simply mark up the material with a pencil or marker.

In cases where the camera cannot track the material, or cannot do so accurately enough, or the material is unsuitable for tracking (e.g. due to an uneven surface), or any other reason that prevents the camera tracking the surface directly, the camera may instead track other markers off of the material. For example, the user could put walls above, below, or around the sides of the material being worked on that have specific features or marks. The features or marks on the surrounding surfaces enable the camera to determine its position on the material. Alternatively, different types of positioning technology or devices could be used to locate the tool 699 or stage 690, possibly in conjunction with a camera 682 that is used mainly for recording the visual appearance of the material without needing to perform the tracking function. Such could be the use of ultrasonic, IR range finding, lasers and the like.

Figure 13:
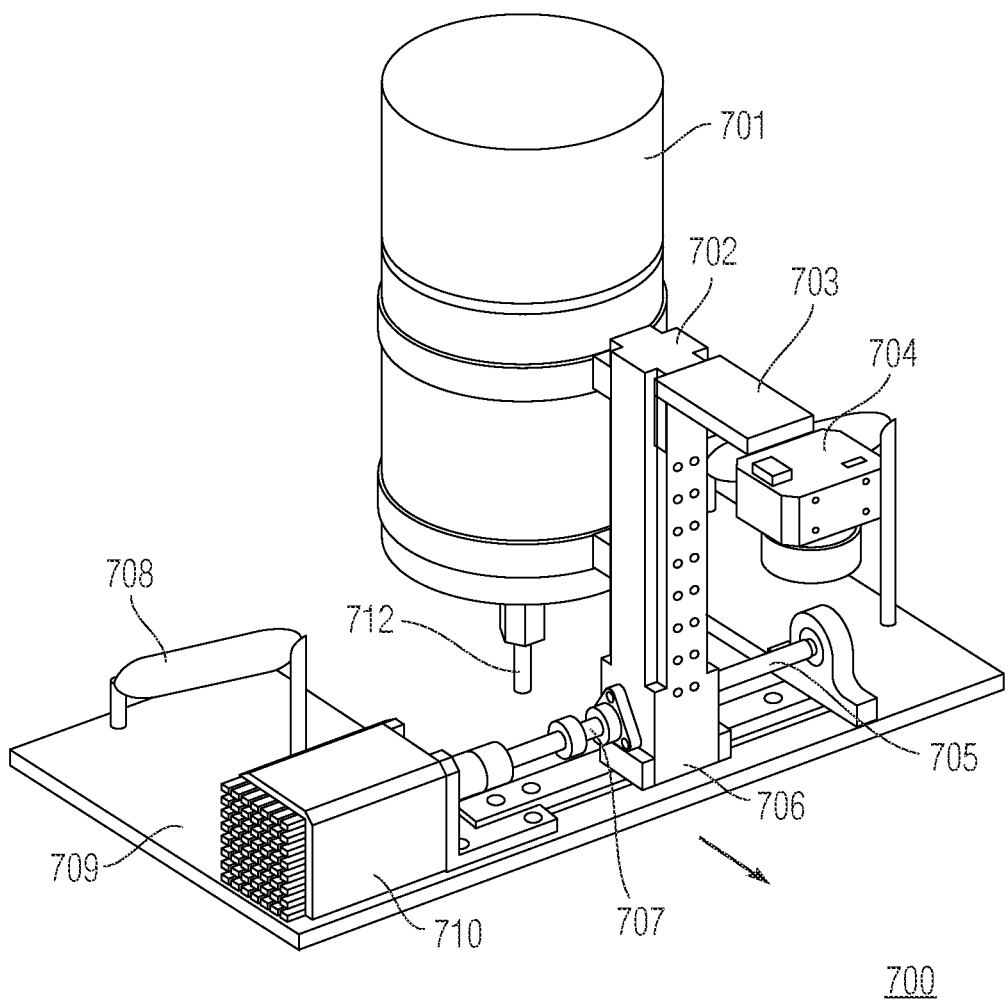
FIG. 13 provides a perspective view of a second exemplary embodiment of the present invention.

As previously discussed in conjunction with FIGS. 1-9, the present invention described a handheld computer controlled router system using an eccentric cam movement of a stage to control the router. However, eccentric cam movement is not the only design or method that can be employed to move a tool or stage. As seen in FIG. 13, a linear based design is depicted. The system 700 includes a router 701 which is mounted to a tool arm 702. The tool arm 702 is built on top of the linear stage base 706. The linear stage base 706 moves in a back and forth direction along the axis line formed by the lead screw 705 and the precision nut 707. Linear movement is achieved by controlling the stepper motor 710 which turns the lead screw 705 which moves the precision nut 707 forcing the linear stage base 706 to move. The stepper motor and end of the linear system are mounted on the base 709. Handles 708 are attached to the base 709 for users to move the system 700 on the material.

The linear system 700 would still use the camera 704 (connected to tool arm 702 using bracket 703) or sensor technology previously described to map the surface of the material and determine the coordinates or location of the device 700 on the material. The user would scan the material with the camera 704 to make a map as described above. Next the user would create, download, or otherwise obtain a design and register it onto the map of the material. Finally, the user would return to the material with the tool, and follow the cut lines of the plan as closely as possible. Typically, the user would grip the device 700 by the handles 708 and move the device forward while trying to keep the router 701 on the intended cut path or line. While doing so, when the user would inadvertently drift off of the exact cut line or path, the system would detect the error. Since the system 700 knows both its location and the plan it would power the stepper motor 710 to rotate the lead screw 705 to move the router 701 by moving the linear stage base 706 to such a point where the cutting bit 712 intersects the plan line exactly. In this way, the present invention can be used to make complex, curved, and/or precise cuts that could not otherwise be made by hand.

Instead of or in addition to a single linear range of play for positioning the operating tool, the tool could be positioned by any of a variety of other means. It may be advantageous to position the tool along two or three axes (or more if orientation is important). This can potentially be done with the user still pushing the entire device, or without user guidance at all. Even without user guidance, this is not just the same as a CNC router: one advantage here is that the positioning system would not have to be precise or have feedback to determine its position (i.e. no encoders necessary), as the tool head would be doing self-locating. In addition, you would not need to do the cumbersome calibration typically required with a CNC system. Furthermore, the device could be positioned over an area, then left to do work, then repositioned, to achieve an infinite work envelope. In general, any type of positioning may be used—manual positioning by a human, or any type of automatic positioning, or any combination. It could also have wheels or other driving devices and position itself like a rolling robot. It could also have a combination of positioning systems, such as a roughly accurate positioning system with a large range to get it in the ballpark, with a fine-grained positioning system with a smaller range to get high accuracy within the target area.

Both the eccentric and linear embodiments could employ a monitor or display to communicate or display the location of the tool relative to the intended path. The system could also use other methods such as shining a laser point or line where the user should go or some combination thereof.

In certain instances, the tool may need to cut design, such as on a table top or sign, where the cut does not go all the way through and it takes more than one pass to remove all the material required for the design. In such instances, the CPU sends signals to the motors to move the router back and forth within the target range until all material has been removed in accordance with the design. The system can also be configured to provide a notice to the user to wait until all such material within the target range has been removed. The system can also notify the user when it has completed its design in a certain region thus notifying the user it is time to move forward to a new target area.

In addition, the router could be configured to follow a line drawn onto the material itself. In this embodiment, the camera would be placed at the front of the operating tool and would see the drawn line. The system would still use location mapping to stay accurate to the drawn line.

An alternative embodiment using various aspects of the present invention would be for use of the material mapping and tool location for use in printing. Again, the user would build a map and upload a design and would be able to print the design section by section on a large canvas. The system would know which color or colors to emit based on the design and location of the printing tool. After the user mapped the material and uploaded the design the user would simply pass the device over the material to print the image.

Figure 14:
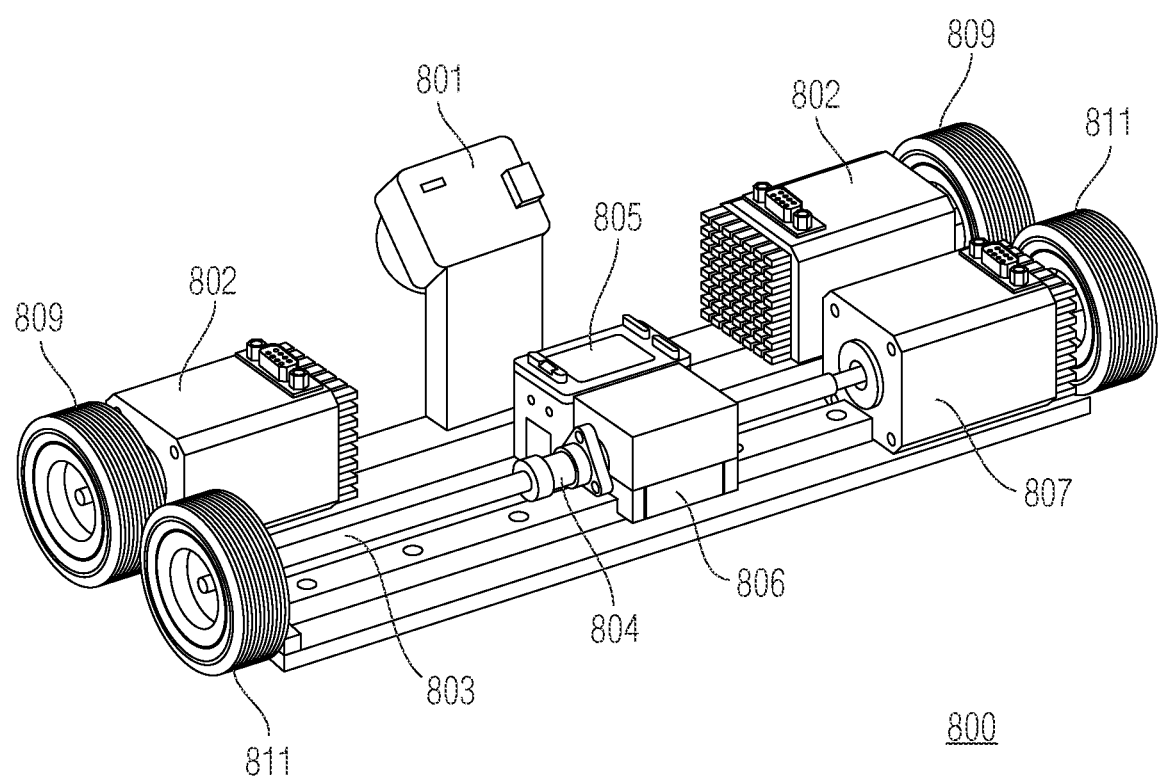
FIG. 14 provides a perspective view of a third exemplary embodiment of the present invention.

The printer embodiment could be manually guided or automatically positioned with wheels (or treads, or other) like a robot. As seen in FIG. 14, a printer embodiment 800 is provided. As with the tool based embodiments, the system 800 includes a camera 801 which is used to build a map of the surface and track the position of the device 800 on the surface. The printer head 805 can slide along a linear stage 806 powered by a stepper motor 807 which rotates a lead screw 803 which moves a precision nut 804.

In one instance, the user builds up a map of the surface and registers an image that is to be printed to that surface. The user then positions the device 800 at one side of the intended printed area. The camera 801 takes an image and determines its position on the surface. The printer head 805 is then moved from one end of the linear stage 806 to the other to lay down a strip of ink. The device 800 is then moved forward the width of one strip of ink (or slightly less to prevent gaps) by stepper motors 802 attached to wheels 809. The printer embodiment 800 also has wheels 811 which are merely to roll when the motor driven wheels 809 are driven. Once the printer 800 has determined its in the correct place for the next strip, the printer prints the strip of ink and repeats until the edge of the image has been reached. In this way, the printer 800 can lay down a band of ink as wide as a strip's length and arbitrarily long. At this point, the printer can either move itself to the next position to start laying down another band of ink, or the user can do this manually.

Various embodiments of the printer system 800 can work either in real time (i.e., printing as it is moving) or by taking steps (printing only when at a stop). Different embodiments can be made to suit different tasks: e.g., a high-speed, real-time version might be built to print billboards, which have low accuracy requirements, while a more precise, slower, step-taking device might be built to do accurate large-format printing, e.g. of posters. Either approach can also be made to work on a wall, which would make it possible to print murals, advertisements, or other images directly onto a wall, rather than having to print the image on wall paper and then stick it up. In addition, this tool could easily be made to work with curved surfaces, which are typically extremely difficult to cover with images.

The printer embodiment 800 could be adapted for use with any type of paint including inkjet, liquid or spray paints, markers, laser printing technology, latex based paints, and oil based paints.

The mapping phase could be also be bypassed if it was clear the material size was greater than the design. The user would simply determine a starting point that corresponds with a region on the design (i.e. the top right corner) and the system 800 would start painting the image. Such would be useful when painting many copies of a single image in many locations.

The embodiments discussed herein so far have focused on rigs which accommodate a tool being attached to a stage and the stage is moved or controlled by one or more motors. The linear design depicted a router moved by a motor where the router is connected to a linear stage. In such instances, the router is attached or mounted as a separate unit. However, the system could easily be designed as one unit where the stage, motors moving the stage, controllers, and all within the same housing and within the same power system as the housing and power of the tool. By way of example, the router housing would be enlarged to fit the stage and motors and might include a display integrated into the housing. Through such an embodiment, the form factor might be improved to look like a one piece tool.

The embodiments presented here are not meant to be exhaustive. Other embodiments using the concepts introduced in the present invention are possible. In addition, the components in these embodiments may be implemented in a variety of different ways. For example, a linear stage, or a hinge joint, or an electromagnetic slide, or another positioning mechanism may be used to adjust a tool or the stage the tool is on in reaction to its detected position and its intended position.

By way of example, the present invention could also be used with drills, nail guns, and other tools that operate at a fixed position. In such embodiments, the tool and software could be modified such that the plan consists of one or more target points instead of a full design. The device could be moved by the user such that a target position is within the adjustment range. The software could then move the tool to the correct target position. The user could then use the tool to drill a hole, drive in a nail, or whatever the desired function is.

Alternatively, these tools can also be used without automatic adjustment. The stage, pivot, motors, and eccentrics could be removed. The tool could be attached to the lower stage housing. The software could be modified such that the plan consists of one or more target points. The user could move the device such that the tool is directly over the target position. The user could use the location feedback provided on the display to perform accurate positioning.

In an alternative embodiment, the present invention could also be used to position a jigsaw. A jigsaw blade can be rotated and moved in the direction of the blade, but not moved perpendicular to the blade or it will snap. The present invention could be modified to include a rotating stage which would be placed on top of the positioning stage. The jigsaw would be attached to this rotating stage. The software would be modified to make the jigsaw follow the plan and rotate to the correct orientation, and made to ensure that the jigsaw was never moved perpendicular to the blade. A saber saw could also take the place of the jigsaw to achieve the same effect. The cutting implement would be steered by rotating the rotating stage, and the cutting implement could be moved along the direction of cutting by moving the positioning stage.

Another possibility would be to only support rotation and not support translation. This could be done by automating the orientation of the blade in a scrolling jigsaw (which is a jigsaw with a blade that can be rotated independently of the body). In this embodiment, the software would only steer the blade to aim it at the correct course; the user would be responsible for controlling its position.

The present invention could also be used to position a scroll saw. In this embodiment, the camera would be on the scroll saw, and the user would move the material. The upper and lower arms of the scroll saw could be mechanized such that they could be independently moved by computer control. The user would then move the material such that the plan lay within the adjustment range of the scroll saw, and the software would adjust the scroll saw to follow the plan. The upper and lower arms could be moved to the same position, or moved independently to make cuts that are not perpendicular to the material.

The invention could also be used in an alternative embodiment where the position correcting device is mounted to a mobile platform. In this embodiment, the device could be placed on material and left to drive itself around. The invention could also be used in an alternative embodiment in which two mobile platforms stretch a cutting blade or wire between them. In this embodiment, each platform could be controlled independently, allowing the cutting line to be moved arbitrarily in 3D, for example to cut foam.

The invention could also be used as an attachment to vehicles or working equipment such as a dozer in which the position-correcting mechanism is mounted on the vehicle. In this embodiment, the vehicle could be driven over a sheet of material such as steel plate lying on the ground, and a cutting tool such as a plasma cutter could be used to cut the material. The invention could also be used as a plotting device or painting device, for example to lay out lines on a football field or mark a construction site.

Although SLAM was described as the exemplary mode for mapping and determining the location of the tool 699, it is to be understood that various other location processing and determining technologies are possible, such as, but not limited to, integrating wireless position sensing technologies, such as RF, near field communication, Bluetooth, laser tracking and sensing, and other suitable methods for determining the position of the tool 699 on top of the work piece.

Although various steps are described herein according to the exemplary method of this invention, it is to be understood that some of the steps described herein may be omitted, and others may be added without departing from the scope of this invention.

It will be recognized by those skilled in the art that changes or modifications may be made to the herein described embodiment without departing from the broad inventive concepts of the invention. It is understood therefore that the invention is not limited to the particular embodiment which is described, but is intended to cover all modifications and changes within the scope and spirit of the invention.

APPENDIX

0. Abstract

Many kinds of digital fabrication are accomplished by precisely moving a tool along a digitally-specified path. This precise motion is typically accomplished fully automatically using a computer-controlled multi-axis stage. In this approach, one can only create objects smaller than the positioning stage, and large stages can be quite expensive. We propose a new approach to precise positioning of a tool that combines manual and automatic positioning: in this approach, the user coarsely positions a frame containing the tool in an approximation of the desired path, while the device tracks the frame's location and adjusts the position of the tool within the frame to correct the user's positioning error in real time. Because the automatic positioning need only cover the range of the human's positioning error, this frame can be small and inexpensive, and because the human has unlimited range, such a frame can be used to precisely position tools over an unlimited range.

1. Introduction

Personal digital fabrication endeavors to bridge the gap between computer graphics and the real world, turning virtual models into physical objects. Novel software modeling allows users to create unique objects of their own design, e.g. [Mori and Igarashi 2007; Kilian et al. 2008; Lau et al. 2011; Saul et al. 2011], which can then be fabricated using 2D devices such as laser or water jet cutters, or 3D devices such as 3D printers and computer numerical control (CNC) mills. While rapid prototyping machines are dropping in price, affordable tools have severe size limitations because of the expense of a precise and long-range positioning system. As an illustration, a 2'×1.5' ShopBot CNC mill costs approximately $6,000, while a 5'×8' ShopBot mill costs over $20,000 [ShopBot Tools].

We aim to reduce the cost of digital fabrication for the domain of 2D shapes while simultaneously removing constraints on range. Our central idea is to use a hybrid approach to positioning where a human provides range while a tool with a cheap short-range position-adjustment enables precision. Given an input 2D digital plan such as the outline of a shape, the user manually moves a frame containing a tool in a rough approximation of the desired plan. The frame tracks its location and can adjust the position of the tool within the frame over a small range to correct the human's coarse positioning, keeping the tool exactly on the plan (FIG. 1). A variety of tools can be positioned in this manner, including but not limited to a router (which spins a sharp bit to cut through wood, plastic, or sheet metal in an omnidirectional manner) to cut shapes, a vinyl cutter to make signs, and a pen to plot designs.

In this approach, the core challenges are localization (determining the current position of the tool) and actuation (correcting the tool's position). For localization, we use computer vision and special markers placed on the material. For actuation, we present a new two-axis linkage that can adjust the position of the tool within the frame. We also describe an interface for guiding the user using a screen on the frame, which illustrates the tool's current position relative to the plan. We show an example of a device (FIGS. 1-9) built using our approach which can be fitted with a router or a vinyl cutter, and show results that can be achieved with these tools when they are positioned with our computer-augmented approach. The device (a position correcting tool) consists of a frame and a tool (in this case a router) mounted within that frame. The frame is positioned manually by the user. The device can adjust the position of the tool within the frame to correct for error in the user's coarse positioning.

2. Related Work

Personal digital fabrication has been an active area of research within the computer graphics community, in particular on interfaces that integrate fabrication considerations with design. Several papers have presented systems to allow fabrication-conscious design of a variety of material and object types, such as plush toys [Mori and Igarashi 2007], chairs [Saul et al. 2011], furniture [Lau et al. 2011], shapes made out of a single folded piece of material [Kilian et al. 2008], and paneled buildings [Eigensatz et al. 2010]. Other papers explore how to generate designs with desired physical properties, such as deformation characteristics [Bickel et al. 2010], appearance under directed illumination [Alexa and Matusik 2010], and subsurface scattering [Dong et al. 2010; Hašan et al. 2010].

When it comes to fabricating objects from these designs, the most widely used devices are 3D printers, laser cutters, and CNC milling machines. Recently, a variety of efforts growing out of the DIY community have sought to reduce the cost of 3D printers [MakerBot Industries: Drumm 2011; Sells et al.] and CNC mills [Hokanson and Reilly; Kelly] for personal use. These projects typically provide relatively cheap kits for entry-level devices. However, as with professional models, positioning is done with a multi-axis stage, and the tradeoff between cost and range remains.

Our computer-augmented positioning approach removes the limitation on range of the above technologies. To do so, it relies on accurately detecting the position of the frame in real time. A variety of approaches to real-time localization have been employed over the years, from global-scale GPS [Getting 1993] to local-scale systems based on radio and ultrasonic signals [Priyantha et al. 2000]; an overview is given in a survey by Welch and Foxlin [2002].

Our approach to localization is computer vision-based. Computer vision has been widely used for position tracking in the context of motion capture (see Moeslund et al. [2006] for a survey). These setups typically use stationary cameras tracking a moving object, though recently Shiratori et al. [2011] proposed a system in which cameras are placed on the human and track the environment. In our approach, the camera is on the tool and tracks the material over which it moves, first stitching frames together to make a map of the material (see Zitova and Flusser [2003] and Szeliski [2006] for surveys of image registration and stitching techniques) and then using that map to perform localization. This approach has been used before, with some differences, in a recent new peripheral, LG's LSM-100 scanner mouse [LG; Zahnert et al. 2010], which is a mouse that can scan a document it is passed over. Our implementation differs from theirs in that we use only a camera (no optical mice), capture a wider area of the material in each frame, and use high-contrast markers placed on the material to allow capture of untextured materials.

3. Localization

To keep the tool on the plan as closely as possible, the tool must detect its current position accurately, robustly, and with low latency.

Figure 17:
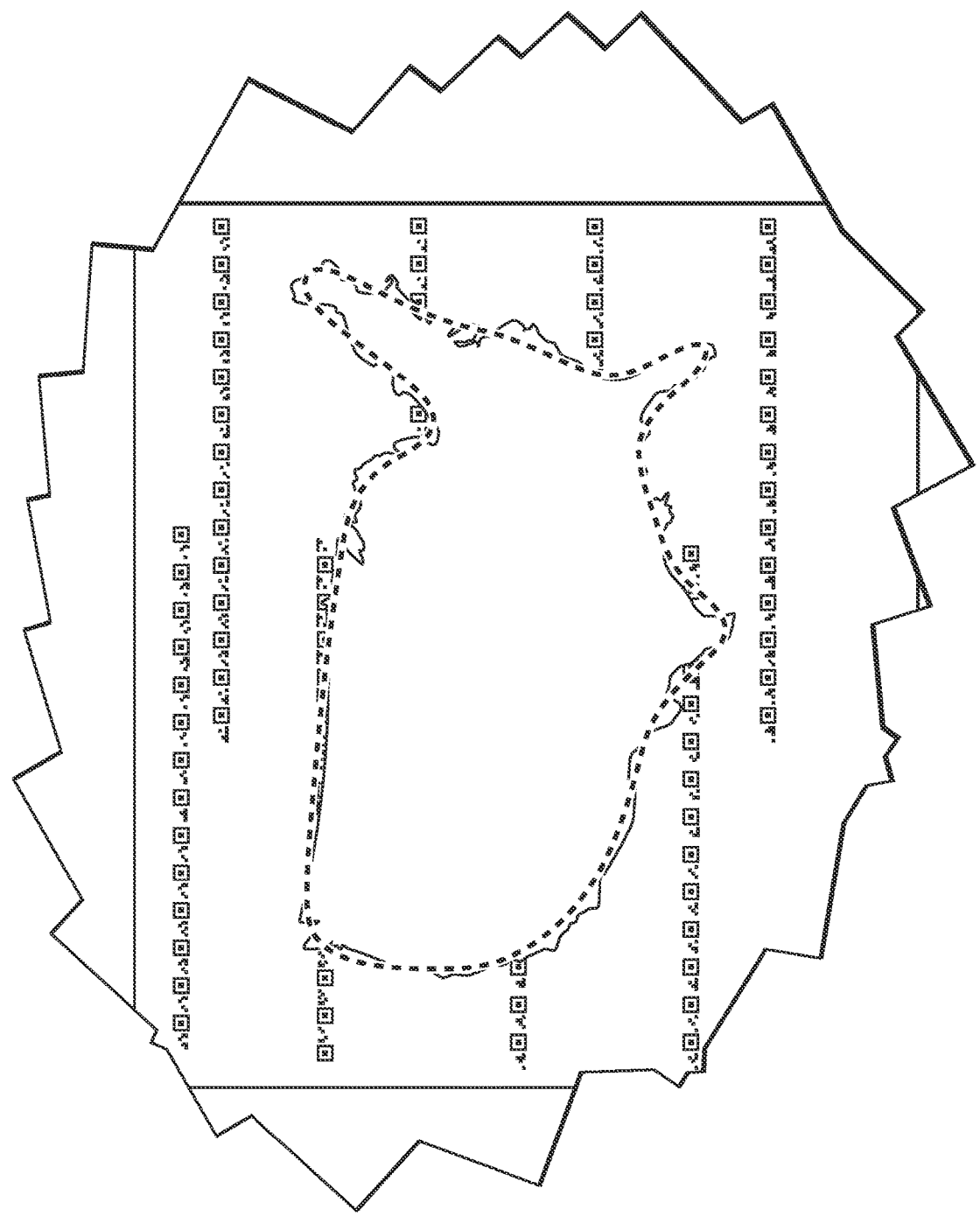
FIG. 17 Map: A scanned map with a plan registered to it. The red dotted line indicates a path that a user could conceivably follow to cut out the shape.

To this end, we considered a variety of localization systems, eventually settling on a simple computer vision-based approach, in which a camera on the frame of the device tracks high-contrast markers placed (in an arbitrary pattern) on the material. In this approach, a map of the material (FIG. 17) is first built by passing the device back and forth over the material to be cut; then, images from the camera are compared to this map to determine the device's location. This was chosen for a variety of reasons: it can achieve very high accuracy; it always remains calibrated to the material (as the markers are on the material itself, as as opposed to, e.g., external beacons, which can become uncalibrated); it does not require excessive setup; the hardware required is relatively inexpensive; and it can be implemented using standard computer vision techniques. Building the map is fast and easy.

3.1. High-Contrast Markers

Figure 18:
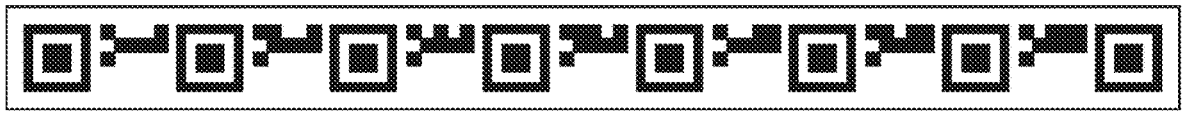
FIG. 18 Markers: A sequence of markers, with values 1000 to 1006, such as would be printed on a strip of tape.

We leverage specially-printed tape marked with high-contrast patterns to make it possible to track materials that have no visual features of their own (such as sheet metal or plastic) and to increase robustness under varying lighting conditions. This tape is applied before map-making, in an any pattern so long as some tape is visible from every position that the device will move to, and can be removed when the job is complete. The tape consists of many QR-code-like markers [Denso-Wave Incorporated] in a row, each consisting of an easily-detectable box-within-box pattern we call an "anchor" and a 2D barcode that associates a unique number with the anchor (see FIG. 18). As long as four of these markers are visible at any time (which is typically the case even if only a single piece of tape is visible), the device is able to locate itself. The redundancy of the markers means that it does not matter if some are occluded (e.g. by sawdust) or obliterated by the tool itself. Note that these markers function just as features—their positions are not assumed before mapping, and therefore they need not be laid out in any specific pattern.

3.2. Image Processing

The core operations used during locating and building a map are detecting markers in an image and registering one set of markers onto another.

Detecting markers To detect markers, the frame is first binarized using the Otsu method [1979]. Anchors are extracted using a standard approach to QR code reading: first, horizontal scanlines are searched for runs of alternating pixel colors matching the ratio of 1:1:3:1:1, as will always be found at an anchor. Locations that match this pattern are then checked for the same pattern vertically. Locations that match horizontally and vertically are then flood filled to confirm the box-within-box pattern. Once anchors have been extracted, each anchor is experimentally matched with the nearest anchor, and the area in between is parsed as a barcode. Barcode orientation is disambiguated by having the first bit of the 2D barcode always be 1 and the last bit always be 0. If the parsed barcode does not match this pattern, the next-nearest anchor is tried. If neither matches, the anchor is discarded. If the pattern is matched, the barcode's value is associated with the first anchor and that anchor's position is added to the list of detected markers.

Matching sets of markers One set of markers is matched to another using a RANSAC algorithm. The potential inliers are the pairs of markers from the two sets that share the same ID. The model that is fit is the least-squares Euclidean transformation (rotation and translation).

3.3. Building a Map

Mapping is done by stitching together video frames into a 2D mosaic (FIG. 17) as the user passes the device back and forth over the material. To reduce computation loads, we retain only frames that overlap with the previously retained frame by less than 75%. We use a simple method to stitch images together: as frames are acquired, they are matched to all previous frames and assigned an initial position and orientation by averaging their offsets from successfully matched frames; once all images have been acquired, final positions and orientations are computed by iteratively applying all constraints between successfully matched frames until the system converges to a stable configuration.

Once the map is complete, a super-list of markers for the entire map is generated from the markers in input images by averaging the map-space positions of markers that share the same ID. This global list of known positions for each marker ID is what is used to localize new images when the device is in use.

When preparing to cut a shape, the user will register a shape onto this 2D map. Having the map of the material makes it trivial to visually align the plan with features of the material. This would otherwise require careful calibration relative to a stage's origin point, as is usually the case with a CNC machine.

3.4. Localization Using the Map

Once the map has been created as above, registering a new image to the map is straightforward. Markers are detected as above and matched to the global list of markers from the map using the same RANSAC algorithm as above. An image from the camera can be registered to a map in ~4 milliseconds total on a standard laptop. Although localization exhibits strong time-coherence, thanks to the low cost of processing we can afford to solve the system from scratch at every frame.

4. Actuation

Once the location of the frame is known, the tool must be repositioned within the frame to keep it on the plan. This task can be broken down into the control challenge of determining where within the frame to move (as there are usually many possible positions that lie on the plan) and the mechanical engineering challenge of building an accurate, responsive, and low-cost position-adjusting actuation system.

The range of our positioning linkage was determined by first attempting to move the frame along a 2D plan as closely as possible by hand. We found that when provided with accurate location information relative to the plan a user can keep the tool within ⅛" of the plan, even when cutting wood. (Having accurate location information allows for greater precision than normal freehand positioning.) To allow a safety margin and increase ease of use, we doubled this value to arrive at the goal of being able to correct errors up to ¼" (i.e. having a range circle with a ½" diameter).

4.1. Actuation System

The actuation system need only support a small range of motion, as it need only correct the coarse positioning done by the human. This affords the possibility of using a very different design for the positioning system than the multi-axis stage employed by traditional rapid prototyping machines.

Our major mechanical departure from traditional rapid prototyping machines is that we use eccentrics, rather than linear stages, to convert the rotational motion of the motors into linear motion. Eccentrics are circular disks rotating around an off-center shaft. As they are rotated, they produce linear motion in a collar wrapped around the disk. Eccentrics are able to maintain the same low-backlash accuracy of a precision linear stage while being much cheaper. For this, they sacrifice range. However, a linear displacement range of ½" is well within the capabilities of an eccentric.

Figure 19A:
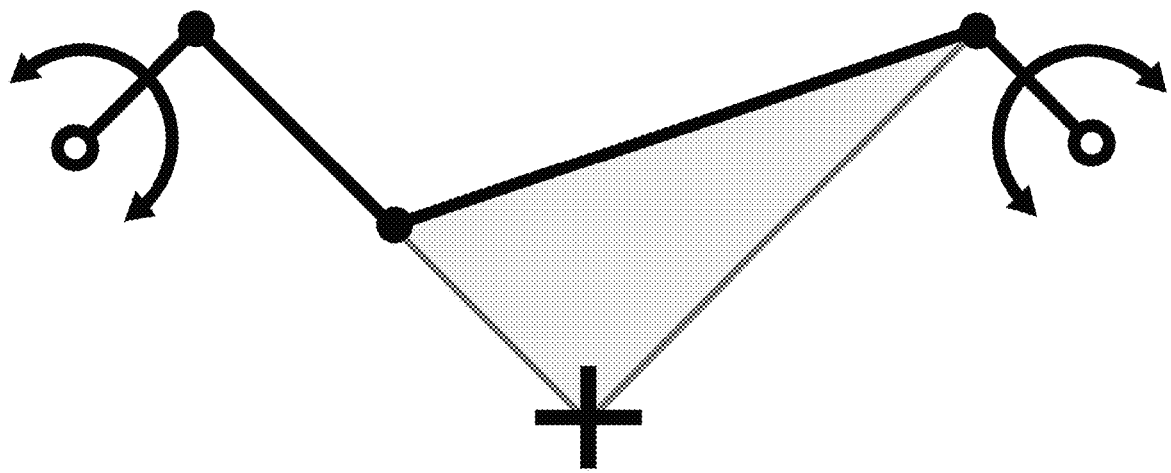
FIG. 19(a) Positioning linkage: The mechanics of our linkage can be conceptualized as two shafts (unfilled circles) rotating arms that are connected with pivots (filled circles) to a rigid stage (shaded region) that holds the spindle (cross). To properly constrain the degrees of freedom of the stage, one arm is directly connected to the stage while the other is connected via an additional hinge.
Figure 19B:
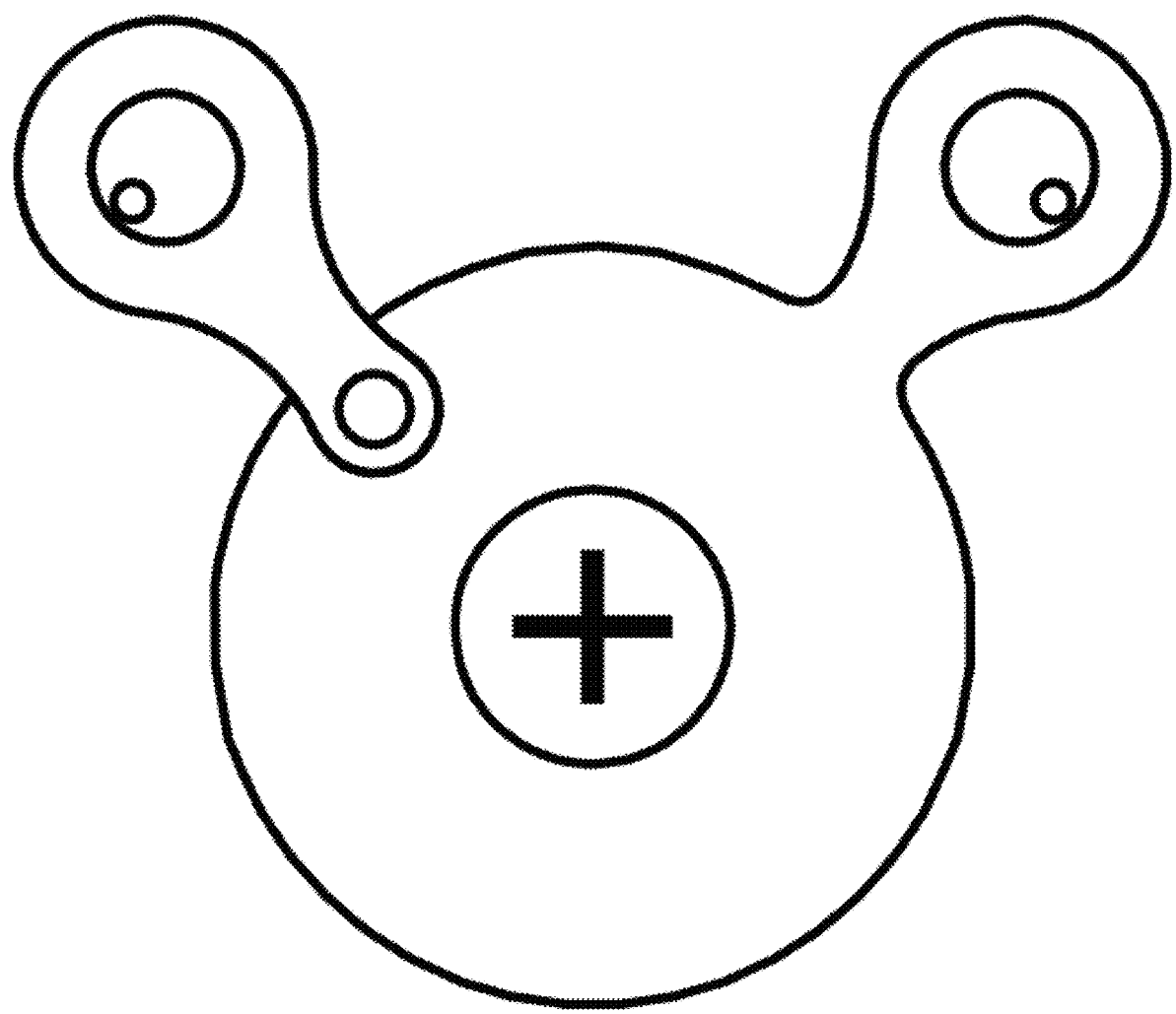
FIG. 19(b) The design is achieved in practice using eccentrics, which are circular disks rotating about off-center shafts to produce linear displacement in fitted collars.

Our design (FIGS. 9, 19(*a*), and 19(*b*)) consists of two eccentrics mounted to the frame and connected to a stage that can slide on its base. The eccentrics are rotated by stepper motors, and by rotating them the stage can be moved within the frame. To properly constrain the stage, one eccentric is connected directly to the stage by a ball bearing coupling, while the other is connected both by a coupling and a hinge.

This linkage design results in a nonlinear relationship between eccentric orientation and stage position: near the center of its range, moderate rotation of an eccentric produces moderate motion of the stage, while near the edge of its range much larger rotations are necessary to move the stage a fixed amount. We limit stage displacement to ~95% of the maximum range to cut out the positions with extreme nonlinearity. This linkage design also permits backdriving, in that forces acting on the tool can cause the cams to rotate away from their target positions; however, we found that the stepper motors we use (62 oz-in holding torque) are sufficiently powerful to preclude backdriving, even in the presence of significant material forces.

4.2. Following a Plan

As the user moves the frame, the device must ensure that the tool stays on the plan. To do this, the path that is to be followed must be first computed (which may not be the same as the plan); then, every frame, given the frame's position, the tool's position within the frame, and the plan, the device must determine where to move the tool within the frame.

For the applications we focus on—routing and vinyl cutting—the user generally wishes to cut a shape out of a piece of material. This means that there will be some areas of the material that are outside the target shape, and which may be cut freely (which we call "exterior material"), while other areas lie inside the target shape and must not be cut ("interior material"). To allow for this distinction, we define a plan as consisting of polygons, with defined insides and outsides, rather than simply as paths.

In applications such as vinyl cutting, the tool should follow the border of the interior material as closely as possible. When routing, however, the size of the cutting bit must be taken into account, and the tool should move along a path offset from the interior material by the radius of the bit, to leave the actual cut shape as close as possible to the specified plan. We provide an option to set the diameter of the cutting bit and offset the plan polygons accordingly.

We propose two different strategies for moving the tool to keep it on the plan, and will show how each of these is appropriate for a different class of applications.

4.2.1. Constant-Speed Motion

In the simpler strategy, the tool is moved through the material at as close to a constant rate as possible. This strategy is useful for applications such as routing, in which the material may offer resistance if the tool is moved too quickly and may burn if the tool is moved too slowly.

In this approach, the user decides only what polygon to follow and when to start motion. Thereafter, the software drives the tool around that polygon at a constant rate. While the tool is moving, the user moves the frame to keep the tool near the center of its range, ensuring that the tool can continue its constant-speed motion without reaching the end of its range. If the tool does reach the end of its range, it must stop until the user catches up.

4.2.2. Freeform Motion

In the second strategy, the user moves the frame around the plan freely, and the device tries to keep the tool at the point on the plan that most "makes sense" given the user's positioning of the frame. This approach is suitable to applications such as plotting or vinyl cutting in which there is negligible material resistance and no need to move at a constant rate.

The point that the tool is moved to is, generally speaking, the closest point on the border of a plan polygon to the center of the tool's range. However, several considerations make determining the path to get to this point complicated. First, the tool should never move through interior material, even if the shortest path from its current position to the target position goes through it. Second, the tool should seek to follow the border of the interior material even when a shorter direct route is possible through exterior material, to avoid skipping over features of the plan.

Figure 20:
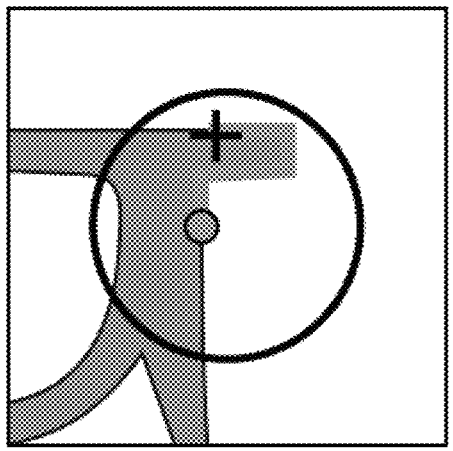
FIG. 20 Freeform motion paths: Each box illustrates a case in which a different path (described below) is used, due to the higher-preference paths being infeasible. In each box, the cross is the current position of the tool, the circle is the range of the positioning system, the green dot is the target position, and the green path is the selected path.
Figure 20:
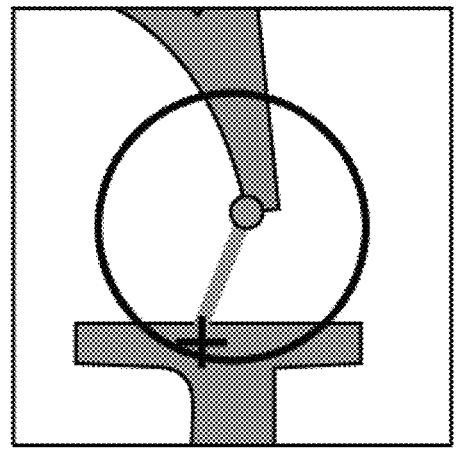
Figure 20:
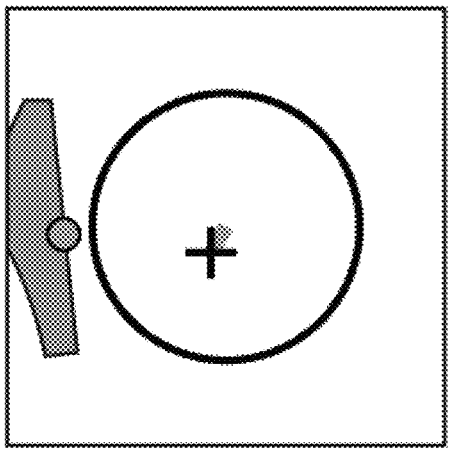
Figure 20:
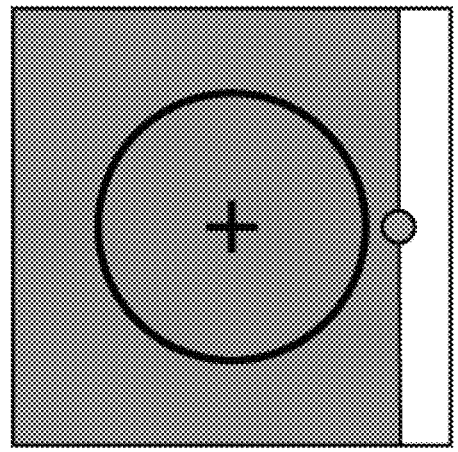

We aim to account for these considerations while also maximizing the predictability of the tool's motion. We propose a simple strategy in which four possible paths are computed each frame, ranking from most desirable to least desirable, and the most desirable path that is feasible is followed. All seek to move the tool to the target position, which is the closest point on the border of a plan polygon to the center of the tool's range, or to the center of the tool's range itself if the target position is not reachable. These paths, illustrated in FIG. 20, are:

I. The path that goes from the tool's position to the nearest point on the border of a polygon, and then walks along the border of that polygon to the target position in whichever direction is shorter. This path is infeasible if it leaves the tool's range or if the target position is on the border of a polygon other than the polygon closest to the tool's position.

II. The path that goes from the tool's position to the nearest exterior material (if it is in the interior material) and then in a straight line to the target position. This path is infeasible if the nearest exterior material is outside the range or the straight line segment passes through interior material.

III. The path that goes from the tool's position to the nearest exterior material (if it is in the interior material) and then in a straight line to the center of the tool's range, stopping whenever interior material is encountered. This path is infeasible if the nearest exterior material lies outside the range of the tool.

IV. Don't move. This path is always feasible.

5. Using the Tool

As described above, use of the device proceeds as follows: the user places marker tape on the material; the user scans the material; the user registers a plan onto the scanned map of the material; the user uses the device to follow the plan. When following a plan, the user roughly follows the shape of the plan, and the positioning linkage moves the router to keep it exactly on the plan. In principle, the tool can follow any 2D path. In the application of routing, this means that it can cut out any 2D shape in a single pass, or more complex 2.5D (heightmap) shapes using multiple passes at different depths.

5.1. User Interface

Figure 21:
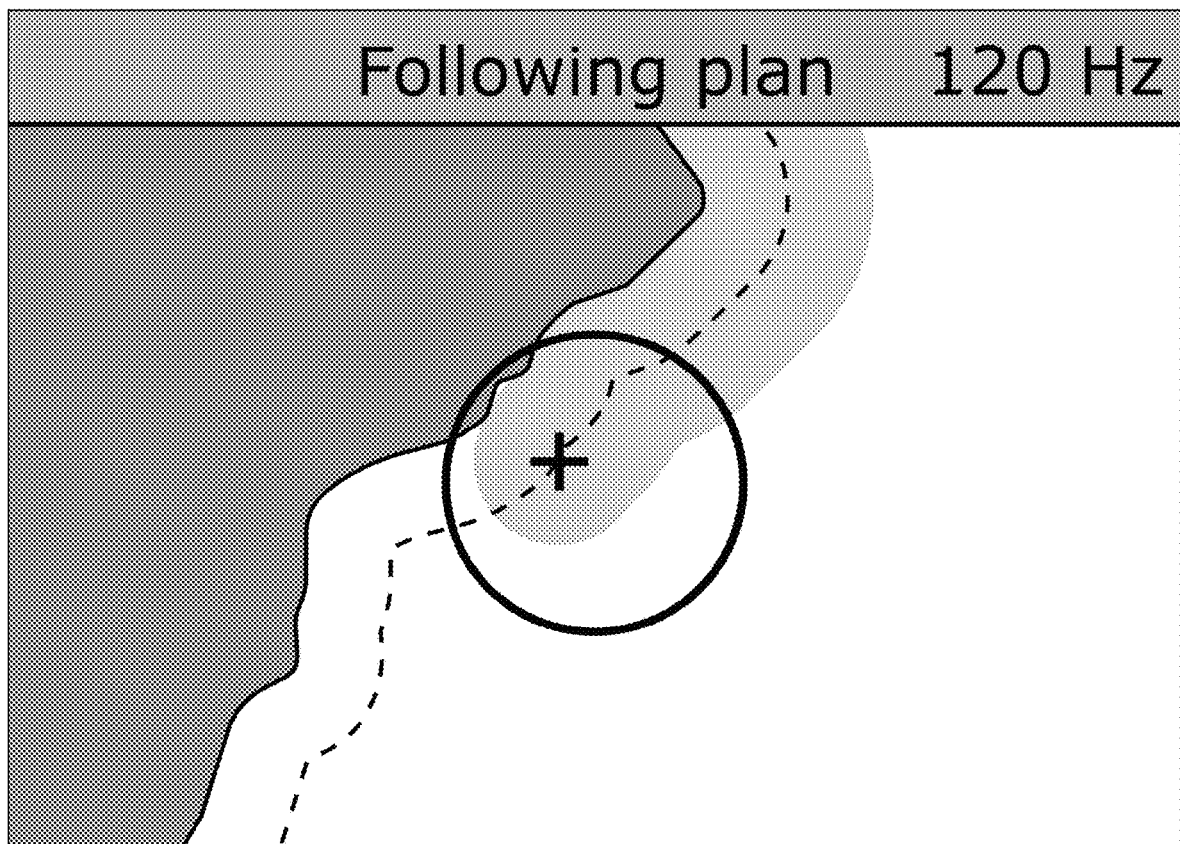
FIG. 21 User interface: This display shows the shapes of the plan (blue polygons); the path that the tool is actually following, which is those shapes offset by the tool's radius (dotted line); the tool's current position (cross); the area cut by the tool (shaded area); and the range of the tool's position correction (black circle). As long as the user keeps the tool path within the correction range, the tool should be able to follow the plan.

When following a plan, the user is shown the position of the tool relative to the plan on the screen (see FIG. 21). In theory, the user's task is to keep the center of the router's motion range as close to the plan as possible. In practice, the user may deviate by as much as the radius of the router's adjustment range.

6. Results

Figure 16A:
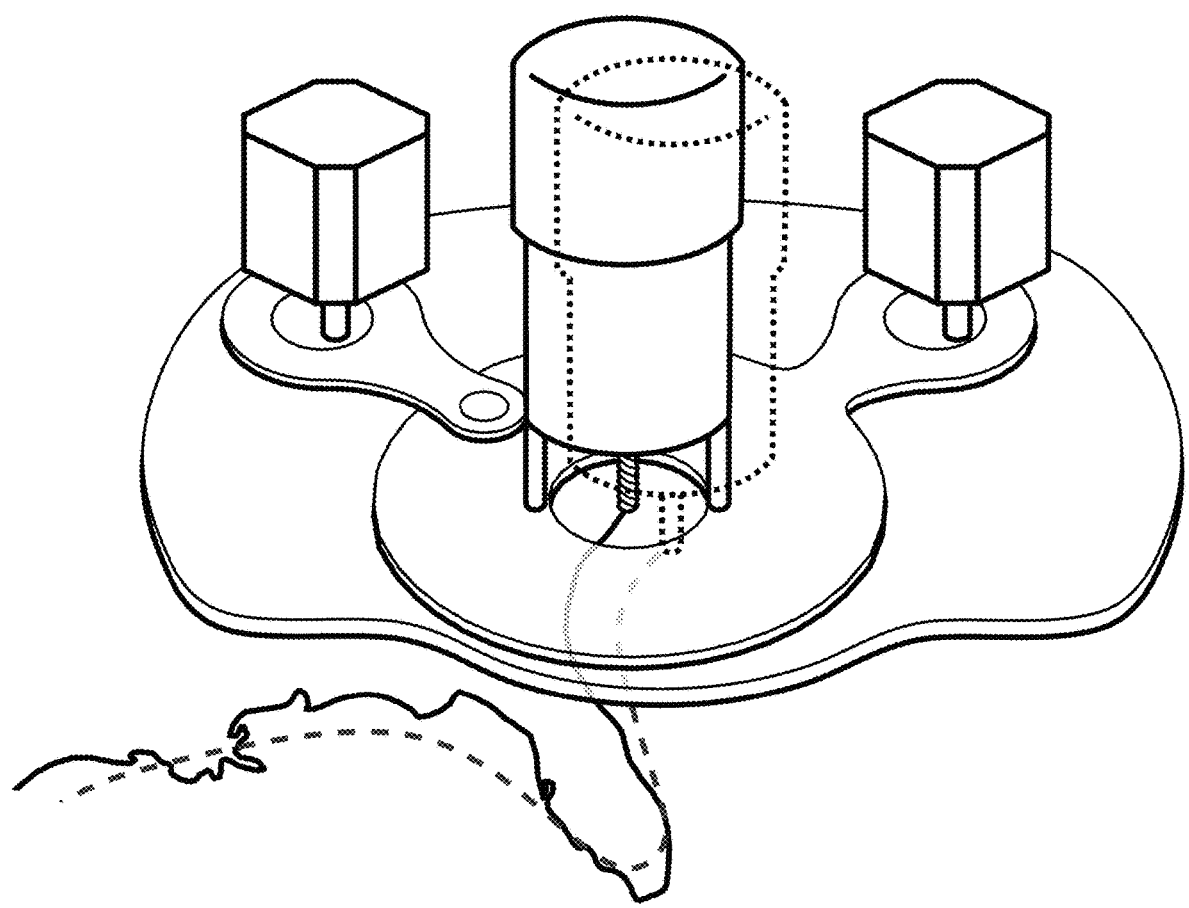
FIG. 16(a) To follow a complex path, the user need only move the frame in a rough approximation of the path. In this example, the dotted blue line shows the path that the tool would take if its position were not adjusted; the black line is its actual path.
Figure 16B:
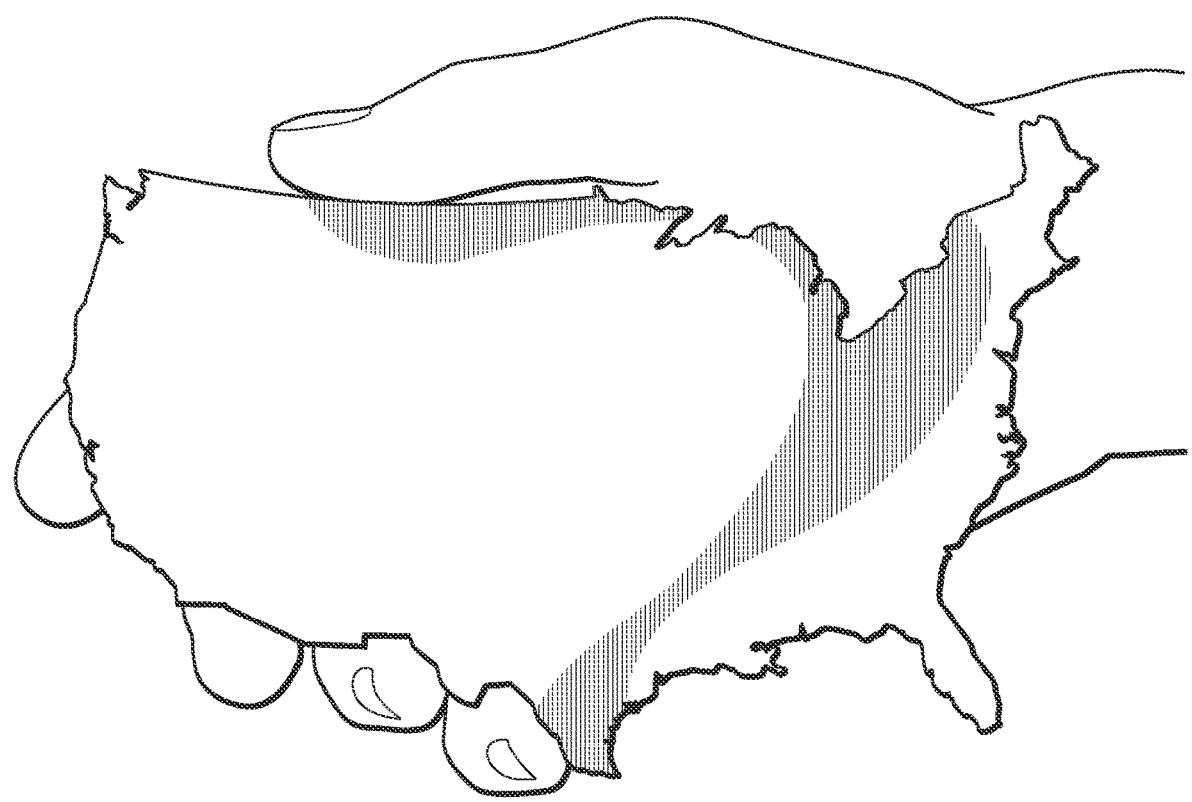
FIG. 16(b) An example of a shape cut out of wood using such a tool.
Figure 22:
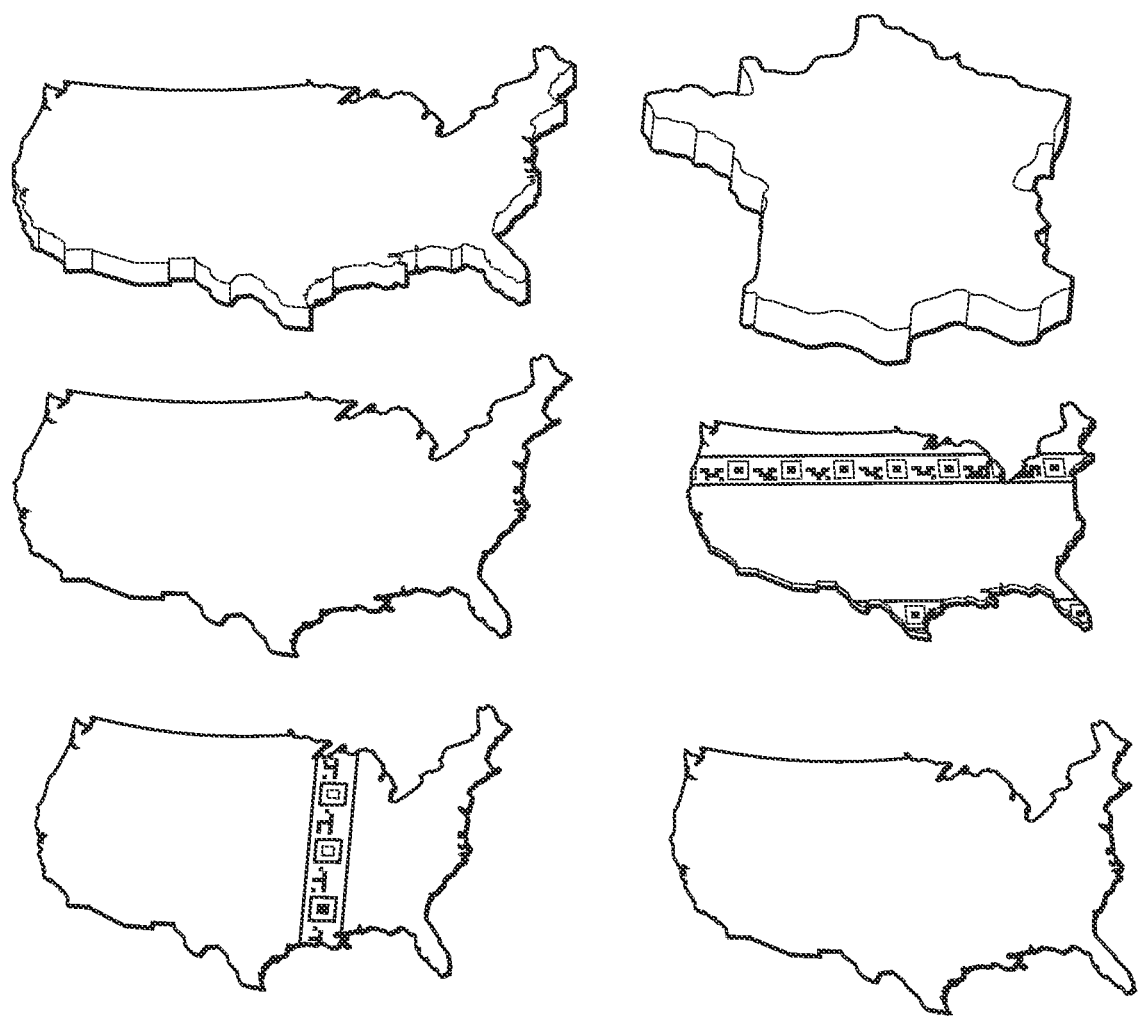
FIG. 22 Results: Several shapes cut out from wood, sheet metal, paperboard, and polycarbonate plastic.
Figure 23:
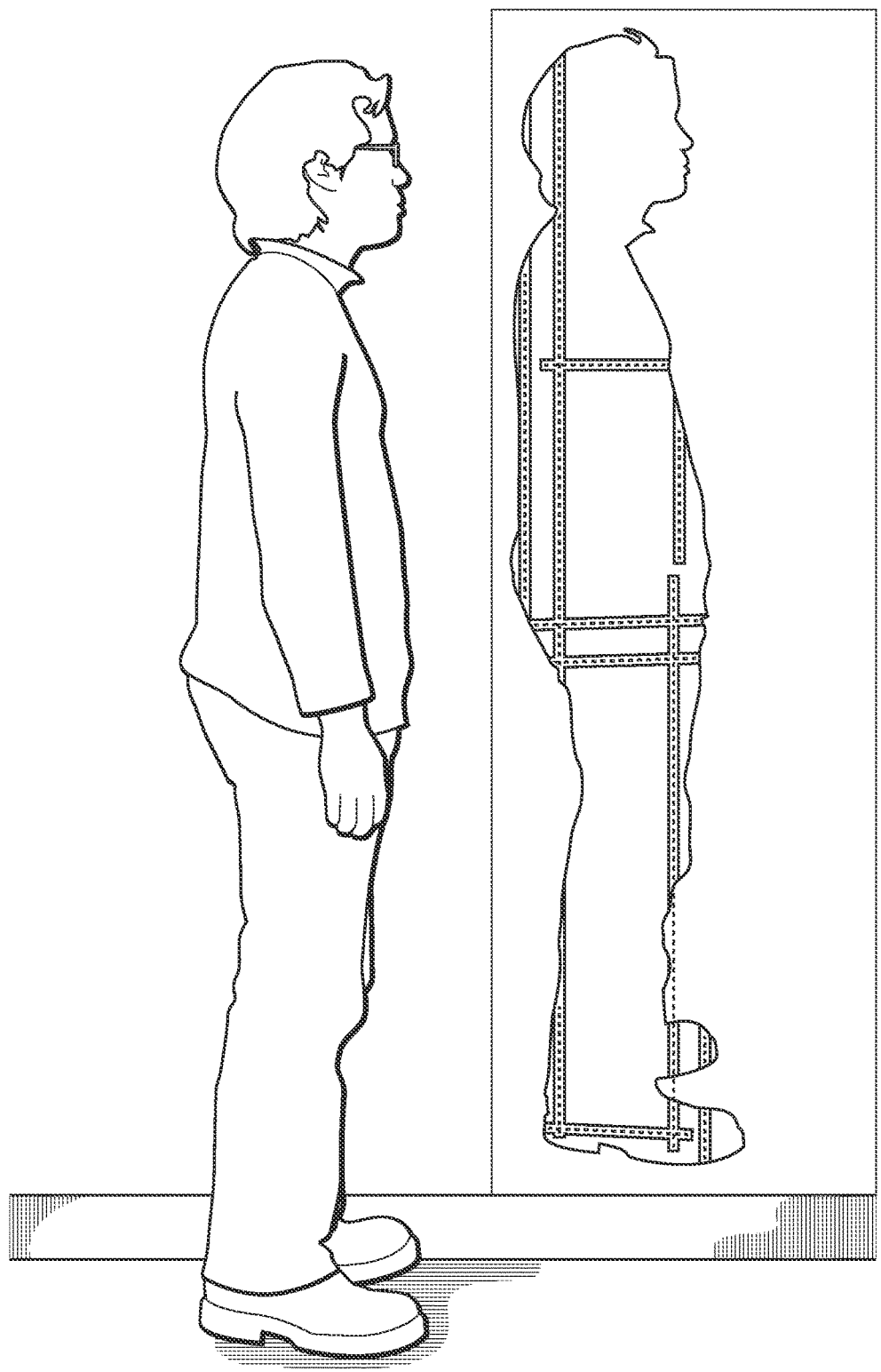
FIG. 23 Range: A full-size vinyl cutout of a human silhouette (5'6" tall), with original.
Figure 24:
FIG. 24 Fine details: With a vinyl cutter, the resolution of features is not limited by the width of the bit. Here, we show a 6"-wide sticker with fine details.

We built a device (FIGS. 1-9) that implements the position-correcting system described above. The device that we built can be mounted a router or vinyl cutter, and can follow any 2D plan. FIGS. 16(b) and 22 show shapes cut out of wood, plastic, paperboard, and sheet metal. FIG. 23 demonstrates the ability to follow plans of unlimited range with a full-size vinyl cutout of a human silhouette. FIG. 24 shows an example of a cut shape with high-resolution details.

Figure 25:
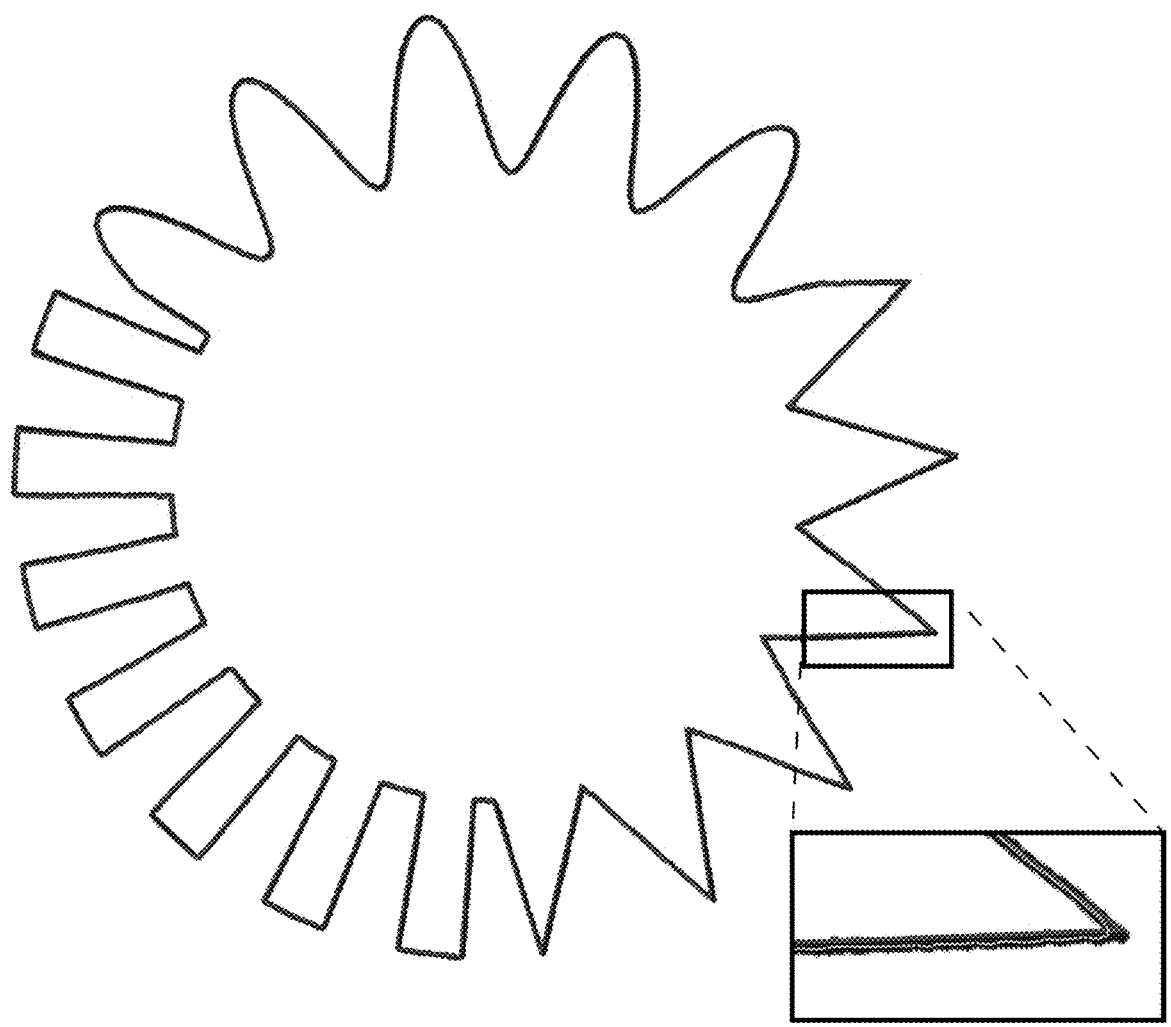
FIG. 25 Accuracy: A scan of a plotted pattern (6" wide) shown with the design that was used to create it (red). The inset shows an expansion of the area of worst error, with the addition of the line fit to the scan for analysis (green). Note that even here the error is only on the order of the width of the pen.

We empirically tested the fidelity of shape reproduction by plotting a complex pattern, scanning the result, and measuring deviation from the digital plan (FIG. 25). The shape was plotted 6" wide. We fitted a curve to the scanned plot, aligned the plan to that curve, and measured deviation from evenly-sampled points along the drawn shape curve to the nearest point on the plan. The average error was 0.009", with a maximum error of 0.023". The error was small enough that the aligned design always fell within the width of the pen stroke.

7. Conclusion and Future Work

We have proposed a computer-augmented positioning system that avoids the cost-versus-range tension that currently affects rapid prototyping devices, and demonstrated a tool using this approach that combines the unlimited range of a human operator with the accuracy of a computerized positioning system. This device incorporates a computer vision-based system for localization and a specially designed low-cost linkage that can be used to adjust the position of a tool within the device's frame. We have shown how this device can be used with a router and a vinyl cutter to accurately fabricate objects from digital plans.

In future work, we would like to explore applying this type of computer-augmented positioning to a variety of other tools and device form factors.

REFERENCES

ALEXA, M., AND MATUSIK, W. 2010. Reliefs as images. ACM Transactions on Graphics 29, 4 (July), 1.

BICKEL, B., BACHER, M., OTADUY, M. A., LEE, H. R., PFISTER, H., GROSS, M., AND MATUSIK, W. 2010. Design and fabrication of materials with desired deformation behavior. ACM Transactions on Graphics 29, 4 (July), 1.

DENSO-WAVE INCORPORATED. QR Code Specification. http://www.denso-wave.com/qrcode/index-e.html.

DONG, Y., WANG, J., PELLACINI, F., TONG, X., AND GUO, B. 2010. Fabricating spatially-varying subsurface scattering. ACM Transactions on Graphics 29, 4 (July), 1.

DRUMM, B., 2011. Printrbot. http://www.printrbot.com/.

EIGENSATZ, M., KILIAN, M., SCHIFTNER, A., MITRA, N. J., POTTMANN, H., AND PAULY, M. 2010. Paneling architectural freeform surfaces. In ACM SIGGRAPH 2010 papers on—SIG-GRAPH '10, ACM Press, New York, N.Y., USA, vol. 29, 1.

FERRAIOLO, J., FUJISAWA, J., AND JACKSON, D., 2003. Scalable Vector Graphics (SVG) 1.1 Specification. World Wide Web Consortium, Recommendation REC-SVG11-20030114.

GETTING, I. 1993. Perspective/navigation—The Global Positioning System. IEEE Spectrum 30, 12, 36-38, 43-47.

GROSS, M. 2009. Now More than Ever: Computational Thinking and a Science of Design. 16, 2, 50-54.

HAŠAN, M., FUCHS, M., MATUSIK, W., PFISTER, H., AND RUSINKIEWICZ, S. 2010. Physical reproduction of materials with specified subsurface scattering. In ACM SIGGRAPH 2010 papers on—SIGGRAPH '10, ACM Press, New York, N.Y., USA, vol. 29, 1.

HOKANSON, T., AND REILLY, C. DIYLILCNC. http://diylilcnc.org/.

KELLY, S. Bluumax CNC. http://www.bluumaxcnc.com/Gantry-Router.html.

KILIAN, M., FLORY, S., CHEN, Z., MITRA, N. J., SHEFFER, A., AND POTTMANN, H. 2008. Curved folding. ACM Transactions on Graphics 27, 3 (August), 1.

LANDAY, J. A. 2009. Technical perspectiveDesign tools for the rest of us. Communications of the ACM 52, 12 (December), 80.

LAU, M., OHGAWARA, A., MITANI, J., AND IGARASHI, T. 2011. Converting 3D furniture models to fabricatable parts and connectors. In ACM SIGGRAPH 2011 papers on—SIGGRAPH '11, ACM Press, New York, N.Y., USA, vol. 30, 1.

LG. LSM-100. http://www.lg.com/ae/it-products/external-hard-disk/LG-LSM-100.jsp.

MAKERBOT INDUSTRIES. MakerBot. http://www.makerbot.com/.

MOESLUND, T. B., HILTON, A., AND KRÜGER, V. 2006. A survey of advances in vision-based human motion capture and analysis. Computer Vision and Image Understanding 104, 2-3 (November), 90-126.

MORI, Y., AND IGARASHI, T. 2007. Plushie. In ACM SIGGRAPH 2007 papers on—SIGGRAPH '07, ACM Press, New York, N.Y., USA, vol. 26, 45.

OTSU, N. 1979. A Threshold Selection Method from Gray-Level Histograms. IEEE Transactions on Systems, Man, and Cybernetics 9, 1, 62-66.

PRIYANTHA, N. B., CHAKRABORTY, A., AND BALAKRISHNAN, H. 2000. The Cricket location-support system. In Proceedings of the 6th annual international conference on Mobile computing and networking—MobiCom '00, ACM Press, New York, N.Y., USA, 32-43.

SAUL, G., LAU, M., MITANI, J., AND IGARASHI, T. 2011. SketchChair. In Proceedings of the fifth international conference on Tangible, embedded, and embodied interaction—TEI '11, ACM Press, New York, N.Y., USA, 73.

SELLS, E., SMITH, Z., BAILARD, S., BOWYER, A., AND OLLIVER, V. RepRap: The Replicating Rapid Prototyper: Maximizing Customizability by Breeding the Means of Production.

SHIRATORI, T., PARK, H. S., SIGAL, L., SHEIKH, Y., AND HOD-GINS, J. K. 2011. Motion capture from body-mounted cameras. ACM Transactions on Graphics 30, 4 (July), 1.

SHOPBOT TOOLS. ShopBot. http://www.shopbottools.com/.

SMITH, A., BALAKRISHNAN, H., GORACZKO, M., AND PRIYANTHA, N. 2004. Tracking moving devices with the cricket location system. In Proceedings of the 2nd international conference on Mobile systems, applications, and services—MobiSYS '04, ACM Press, New York, N.Y., USA, 190.

SZELISKI, R. 2006. Image Alignment and Stitching: A Tutorial. Foundations and Trends in Computer Graphics and Vision 2, 1 (January), 1-104.

WELCH, G., AND FOXLIN, E. 2002. Motion tracking: no silver bullet, but a respectable arsenal. IEEE Computer Graphics and Applications 22, 6 (November), 24-38.

WEYRICH, T., DENG, J., BARNES, C., RUSINKIEWICZ, S., AND FINKELSTEIN, A. 2007. Digital bas-relief from 3D scenes. In ACM SIGGRAPH 2007 papers on—SIGGRAPH '07, ACM Press, New York, N.Y., USA, vol. 26, 32.

XIN, S., LAI, C.-F., FU, C.-W., WONG, T.-T., HE, Y., AND COHEN-OR, D. 2011. Making burr puzzles from 3D models. ACM Transactions on Graphics 30, 4 (July), 1.

ZAHNERT, M. G., FONSEKA, E., AND ILIC, A., 2010. Handheld Scanner with High Image Quality.

ZITOVA, B., AND FLUSSER, J. 2003. Image registration methods: a survey. Image and Vision Computing 21,11 (October), 977-1000.

The invention claimed is:

1. A system to perform a task on a material using a working member of a rig, the rig comprising a stage configured to receive and hold the working member, and one or more motors for moving the stage, the system comprising:
 a processor in combination with one or more software applications;
 a camera, communicatively coupled to the processor; and
 a memory, communicatively coupled to the processor,
 wherein the one or more software applications, when executed, cause the system to:
  generate feature data based at least in part upon one or more images, wherein at least one of the one or more images includes data related to a first set of one or more features associated with a surface;
  register a design, retrieved from the memory, to the feature data;
  obtain a first image, wherein the first image includes data related to a second set of the one or more features associated with the surface, the first image is captured using the camera after registering the design, and the rig is located at a first rig location when the first image is captured;
  provide first information that causes the working member to be positioned at a first target point, wherein the first target point is based at least in part upon the design, the rig is located at the first rig location when the first information is provided, and the first information is based at least upon the feature data, the design, and the first image; and
  provide second information that causes the working member to be positioned at a second target point, wherein the second target point is based at least in part upon the design, the rig is located at the first rig location when the second information is provided, and the second information is based at least upon the feature data, the design, and the first image.

2. The system of claim 1, wherein the rig comprises a base assembly, and the rig rests on the material with a portion of the base assembly in contact with the material when the rig is located at the first rig location.

3. The system of claim 1, wherein the one or more software applications, when executed, cause the system to: obtain the one or more images using the camera.

4. The system of claim 1, wherein the one or more features comprise one or more markers, and each marker is associated with a marker ID.

5. The system of claim 4, wherein the feature data comprises marker information including marker position data and marker ID for each marker.

6. The system of claim 1, wherein the feature data comprises image data.

7. The system of claim 1, wherein the surface is a surface of the material.

8. The system of claim 1, wherein the one or more software applications, when executed, cause the system to: obtain the design from a remote computer system.

9. The system of claim 1, wherein the task comprises cutting the material to remove at least a portion of the material.

10. The system of claim 1, wherein the one or more software applications, when executed, cause the system to:

obtain a second image, wherein the second image includes data related to a third set of the one or more features associated with the surface, the second image is captured using the camera after providing the second information, and the rig is located at a second rig location when the second image is captured, and the second rig location is different from the first rig location; and provide third information that causes the working member to be positioned at a third target point, wherein the third target point is based at least in part upon the design, the rig is located at the second rig location when the third information is provided, and the third information is based at least upon the feature data, the design, and the second image.

11. The system of claim 10, wherein the one or more software applications, when executed, cause the system to:

provide fourth information that causes a notification to be sent to the user, wherein the notification is sent to the user prior to obtaining the second image, and the notification provides an indication for the user to move the rig from the first rig location to a new location.

12. A computer-implemented method of performing a task on a material using a working member of a rig, the rig comprising a stage configured to receive and hold the working member, and one or more motors for moving the stage, the method comprising:

generating feature data based at least in part upon one or more images, wherein at least one of the one or more images includes data related to a first set of one or more features associated with a surface;

registering a design to the feature data;

obtaining a first image, wherein the first image includes data related to a second set of the one or more features associated with the surface, the first image is captured using a camera after registering the design, and the rig is located at a first rig location when the first image is captured;

providing first information that causes the working member to be positioned at a first target point, wherein the first target point is based at least in part upon the design, the rig is located at the first rig location when the first information is provided, and the first information is based at least upon the feature data, the design, and the first image; and providing second information that causes the working member to be positioned at a second target point, wherein the second target point is based at least in part upon the design, the rig is located at the first rig location when the second information is provided, and the second information is based at least upon the feature data, the design, and the first image.

13. The method of claim 12, wherein the rig comprises a base assembly, and the rig rests on the material with a portion of the base assembly in contact with the material when the rig is located at the first rig location.

14. The method of claim 12, further comprising:
obtaining the one or more images using the camera.

15. The method of claim 12, further comprising:
obtaining a second image, wherein the second image includes data related to a third set of the one or more features associated with the surface, the second image is captured using the camera after providing the second information, and the rig is located at a second rig location when the second image is captured, and the second rig location is different from the first rig location; and providing third information that causes the working member to be positioned at a third target point, wherein the third target point is based at least in part upon the design, the rig is located at the second rig location when the third information is provided, and the third information is based at least upon the feature data, the design, and the second image.

16. Non-transitory computer readable media storing instructions to perform a task on a material using a working member of a rig, the rig comprising a stage configured to receive and hold the working member, and one or more motors for moving the stage, wherein the instructions, when executed by a computing system, cause the computing system to:

generate feature data based at least in part upon one or more images, wherein at least one of the one or more images includes data related to a first set of one or more features associated with a surface;

register a design to the feature data;

obtain a first image, wherein the first image includes data related to a second set of the one or more features associated with the surface, the first image is captured using a camera after registering the design, and the rig is located at a first rig location when the first image is captured;

provide first information that causes the working member to be positioned at a first target point, wherein the first target point is based at least in part upon the design, the rig is located at the first rig location when the first information is provided, and the first information is based at least upon the feature data, the design, and the first image; and provide second information that causes the working member to be positioned at a second target point, wherein the second target point is based at least in part upon the design, the rig is located at the first rig location when the second information is provided, and the second information is based at least upon the feature data, the design, and the first image.

17. The non-transitory computer readable media of claim 16, wherein the rig comprises a base assembly, and the rig rests on the material with a portion of the base assembly in contact with the material when the rig is located at the first rig location.

18. The non-transitory computer readable media of claim 16, wherein the instructions, when executed, cause the computing system to:
obtain the one or more images using the camera.

19. The non-transitory computer readable media of claim 16, wherein the instructions, when executed, cause the computing system to:

obtain a second image, wherein the second image includes data related to a third set of the one or more features associated with the surface, the second image is captured using the camera after providing the second information, and the rig is located at a second rig location when the second image is captured, and the second rig location is different from the first rig location; and provide third information that causes the working member to be positioned at a third target point, wherein the third target point is based at least in part upon the design, the rig is located at the second rig location when the third information is provided, and the third information is based at least upon the feature data, the design, and the second image.

* * * * *